US012560692B2

(12) United States Patent (10) Patent No.: US 12,560,692 B2
Ruland et al. (45) Date of Patent: Feb. 24, 2026

(54) SONAR BOTTOM REACQUISITION SYSTEMS AND METHODS

(71) Applicant: Raymarine UK Limited, Fareham (GB)

(72) Inventors: Reid Ruland, Nashua, NH (US); Philip Webb, Fareham (GB)

(73) Assignee: Raymarine UK Limited, Fareham (GB)

( * ) Notice: Subject to any disclaimer, the term of this patent is extended or adjusted under 35 U.S.C. 154(b) by 0 days.

(21) Appl. No.: 17/744,550

(22) Filed: May 13, 2022

(65) Prior Publication Data

US 2022/0381891 A1 Dec. 1, 2022

Related U.S. Application Data

(60) Provisional application No. 63/194,875, filed on May 28, 2021.

(51) Int. Cl.
| | |
|---|---|
| *G01S 7/531* | (2006.01) |
| *G01S 7/56* | (2006.01) |
| *G01S 15/89* | (2006.01) |
| *G01S 15/96* | (2006.01) |

(52) U.S. Cl.
CPC ............... *G01S 7/531* (2013.01); *G01S 7/56* (2013.01); *G01S 15/8902* (2013.01); *G01S 15/96* (2013.01)

(58) Field of Classification Search
CPC ........ G01S 7/531; G01S 7/56; G01S 15/8902; G01S 15/96
See application file for complete search history.

(56) References Cited

U.S. PATENT DOCUMENTS

| | | | | |
|---|---|---|---|---|
| 2008/0144440 A1* | 6/2008 | Scoca | ................... | G01S 15/588 |
| | | | | 367/89 |
| 2016/0170022 A1* | 6/2016 | Laster | ..................... | G01S 15/86 |
| | | | | 367/87 |
| 2017/0285134 A1* | 10/2017 | Stokes | .................... | G01S 15/86 |
| 2017/0363739 A1* | 12/2017 | Lauenstein | ............. | G01S 15/86 |
| 2019/0113619 A1* | 4/2019 | Laster | ................. | G01S 7/52003 |

FOREIGN PATENT DOCUMENTS

CN 102721966 A * 10/2012

\* cited by examiner

*Primary Examiner* — Abdallah Abulaban
(74) *Attorney, Agent, or Firm* — Haynes and Boone, LLP

(57) ABSTRACT

Techniques are disclosed for systems and methods to provide reliable and relatively quick bottom reacquisition in sonar systems for mobile structures, including three dimensional (3D) capable and/or multichannel sonar systems. A sonar system includes a sonar transducer and associated processing and control electronics and optionally orientation and/or position sensors disposed substantially within the housing of a sonar transducer assembly. A logic device of the sonar system is configured to detect bottom lock loss based, at least in part, on sonar data provided by the sonar transducer, determine an expected bottom depth associated with the detected bottom lock loss, and generate updated sonar data based, at least in part, on the expected bottom depth. Resulting sonar data and/or imagery may be displayed to a user and/or used to adjust a steering actuator, a propulsion system thrust, and/or other operational systems of the mobile structure.

16 Claims, 28 Drawing Sheets

1600

100

Acoustic Matching Layer(Optional) 353

Acoustic Backing Layer 352

Water Proof Housing 211

Integral Electronics 320

View at Acoustic Face 212

Waterproof Layer 311a

Electrical Connection and Screening 318b

Peizo Bars 351

318a

Ethernet and Power Cable 214

Multichannel Transducer 250

Transducer Assembly 210

Embodiment Shown with Transom Mount Bracket 311b

300

300D

Multi-Channel Configurations

301D

250

Curved Array

Option 1

302D

250a

250b

2 Angled Flat Arrays

Option 2

453
418b
451
418a
452

452

426

412

450

420

424
422
411

410

400

400C

700

516    520

750

510

701

516    520

752

510

1000B

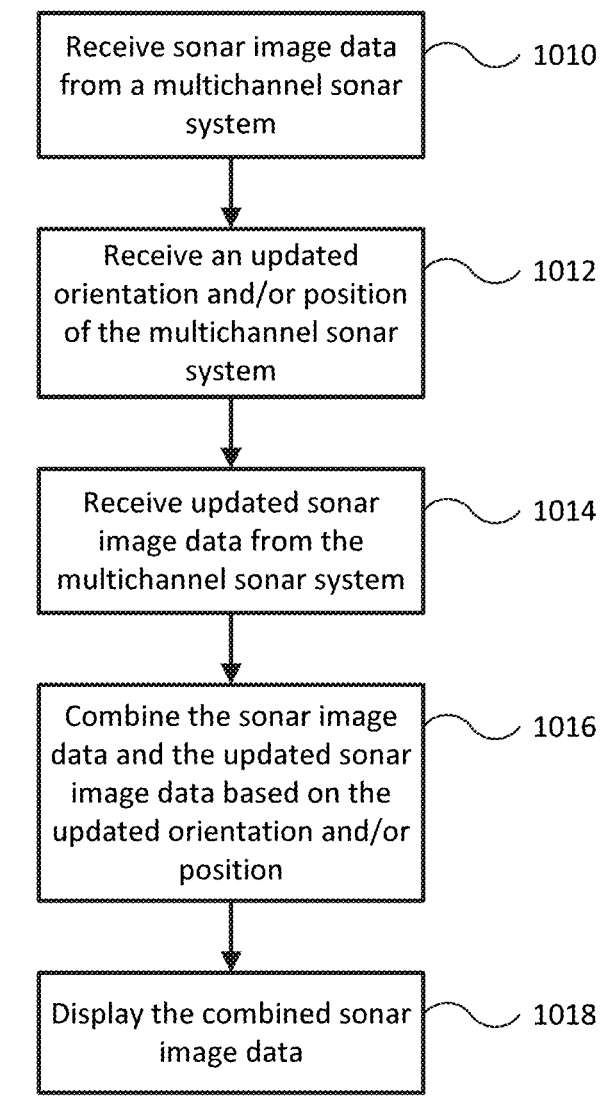

Receive sonar image data from a multichannel sonar system — 1010

Receive an updated orientation and/or position of the multichannel sonar system — 1012

Receive updated sonar image data from the multichannel sonar system — 1014

Combine the sonar image data and the updated sonar image data based on the updated orientation and/or position — 1016

Display the combined sonar image data — 1018

SONAR BOTTOM REACQUISITION SYSTEMS AND METHODS

CROSS-REFERENCE TO RELATED APPLICATIONS

This application claims priority to and the benefit of U.S. Provisional Patent Application No. 63/194,875 filed May 28, 2021 and entitled "SONAR BOTTOM REACQUISITION SYSTEMS AND METHODS," where is hereby incorporated by reference in its entirety.

This application is related to U.S. patent application Ser. No. 17/317,842 filed May 11, 2021 and entitled "3D SONAR SYSTEMS AND METHODS," which is a continuation of International Application No. PCT/US2019/062871 filed Nov. 22, 2019 and entitled "3D SONAR SYSTEMS AND METHODS," which claims the benefit of and priority to U.S. Provisional Patent Application No. 62/771,547 filed Nov. 26, 2018 and entitled "3D SONAR SYSTEMS AND METHODS" which are hereby incorporated by reference in their entirety.

This application is related to U.S. patent application Ser. No. 15/494,232 filed Apr. 21, 2017 and entitled "PILOT DISPLAY SYSTEMS AND METHODS," which is a continuation of International Patent Application No. PCT/US2015/056786 filed Oct. 21, 2015 and entitled "PILOT DISPLAY SYSTEMS AND METHODS", both of which are hereby incorporated by reference in their entirety. International Patent Application No. PCT/US2015/056786 claims priority to and the benefit of U.S. Provisional Patent Application No. 62/066,802 filed Oct. 21, 2014 and entitled "ENHANCED SONAR DISPLAY USING CW/FM PULSE OVERLAYS" and U.S. Provisional Patent Application No. 62/069,961 filed Oct. 29, 2014 and entitled "PILOT DISPLAY SYSTEMS AND METHODS", both of which are hereby incorporated by reference in their entirety.

This application is related to U.S. patent application Ser. No. 15/893,465 filed Feb. 9, 2018 and entitled "3D SCENE ANNOTATION AND ENHANCEMENT SYSTEMS AND METHODS," which claims priority to and the benefit of U.S. Provisional Patent Application No. 62/458,533 filed Feb. 13, 2017 and entitled "3D SCENE ANNOTATION AND ENHANCEMENT SYSTEMS AND METHODS," both of which are incorporated herein by reference in their entirety.

This application is related to U.S. patent application Ser. No. 15/893,431 filed Feb. 9, 2018 and entitled "3D BOTTOM SURFACE RENDERING SYSTEMS AND METHODS," which claims priority to and the benefit of U.S. Provisional Patent Application No. 62/458,529 filed Feb. 13, 2017 and entitled "3D BOTTOM SURFACE RENDERING SYSTEMS AND METHODS," both of which are incorporated herein by reference in their entirety.

This application is related to U.S. patent application Ser. No. 15/353,579 filed Nov. 16, 2016 and entitled "MULTICHANNEL SONAR SYSTEMS AND METHODS," which is a continuation of International Patent Application No. PCT/US2015/032304 filed May 22, 2015 and entitled "MULTICHANNEL SONAR SYSTEMS AND METHODS," which claims priority to and the benefit of U.S. Provisional Patent Application No. 62/005,838 filed May 30, 2014 and entitled "MULTICHANNEL SONAR SYSTEMS AND METHODS," all three of which are hereby incorporated by reference in their entirety.

TECHNICAL FIELD

One or more embodiments of the invention relate generally to sonar systems and more particularly, for example, to systems and methods for reacquiring an ensonified column bottom by a sonar system.

BACKGROUND

Sonar may be used to perform bathymetry, detect underwater hazards, find fish, and/or otherwise assist in navigation by producing data and/or imagery of a water column beneath a watercraft. Conventional sonar systems often include one or more independently operating sonar transducers with temporally and/or spatially non-overlapping beams arranged to help differentiate ensonifications and produce traditionally recognizable sonar imagery.

Bottom acquisition in sonar systems is typically used to optimize various ensonification parameters, which helps reject noise and generate relatively high-quality sonar imagery. Bottom loss, which can occur when an ensonified column includes mixed media (e.g., air bubbles in an ensonified water column) and/or where the column bottom depth changes abruptly, can result in significant sonar data and resulting imagery loss, at least in part due to failure to optimize the various ensonification parameters and to non-acquisition of sonar data while the sonar system is attempting to reacquire the bottom depth. Thus, there is a need for an improved methodology to provide relatively reliable and quick bottom reacquisition in sonar systems.

SUMMARY

Techniques are disclosed for systems and methods to provide reliable and relatively quick bottom reacquisition in sonar systems for mobile structures, including three dimensional (3D) capable and/or multichannel sonar systems, as described herein. A 3D capable sonar system may include a multichannel transducer and associated processing and control electronics and optionally orientation and/or position sensors disposed substantially within the housing of a sonar transducer assembly. A multichannel transducer may include multiple transmission and/or receive channels/transducer elements. A transducer assembly may be configured to support and protect a single and/or multichannel transducer and associated electronics and sensors, to physically and/or adjustably couple to a mobile structure, and/or to provide a simplified interface to other systems coupled to the mobile structure. The system may additionally include an actuator configured to adjust an orientation of the transducer assembly. Resulting sonar data and/or imagery may be displayed to a user and/or used to adjust various operational systems of the mobile structure.

In various embodiments, a 3D capable sonar system may include an orientation sensor, a position sensor, a gyroscope, an accelerometer, and/or one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a sonar transducer assembly including a housing adapted to be mounted to a mobile structure; a sonar transducer disposed within the housing; and a logic device configured to communicate with the sonar transducer. The logic device may be configured to detect bottom lock loss based, at least in part, on sonar data provided by the sonar transducer; determine an expected bottom depth associated with the detected bottom lock loss; and generate updated sonar data based, at least in part, on the expected bottom depth.

In another embodiment, a method may include detecting bottom lock loss based, at least in part, on sonar data provided by a sonar transducer disposed within a housing of a sonar transducer assembly adapted to be mounted to a mobile structure; determining an expected bottom depth associated with the detected bottom lock loss; and generating updated sonar data based, at least in part, on the expected bottom depth.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 10B illustrates a flow diagram of various operations to operate a single and/or multichannel sonar system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sonar bottom reacquisition systems and methods may advantageously include a controller and one or more single and/or multichannel sonar transducer assemblies in conjunction with an orientation sensor, a gyroscope, an accelerometer, a position sensor, and/or a speed sensor providing measurements of an orientation, a position, an acceleration, and/or a speed of the sonar transducer assemblies and/or a coupled mobile structure. For example, the sensors may be mounted to or within the mobile structure (e.g., a watercraft, aircraft, motor vehicle, and/or other mobile structure), or may be integrated with the sonar transducer assemblies and/or the controller.

Embodiments of the present disclosure can reliably produce higher quality imagery and be easier to use than conventional systems and/or methods through use of one or multiple sonar channels and various single and/or multichannel processing techniques, and/or by automatically coordinating sonar system operation with various orientation and/or position measurements. Moreover, such embodiments may be relatively compact and may be formed according to a number of unique sonar transducer arrangements. The unique sonar transducer arrangements, in turn, provide various opportunities to develop new sonar processing and/or data accumulation techniques, as described herein.

Figure 1A:
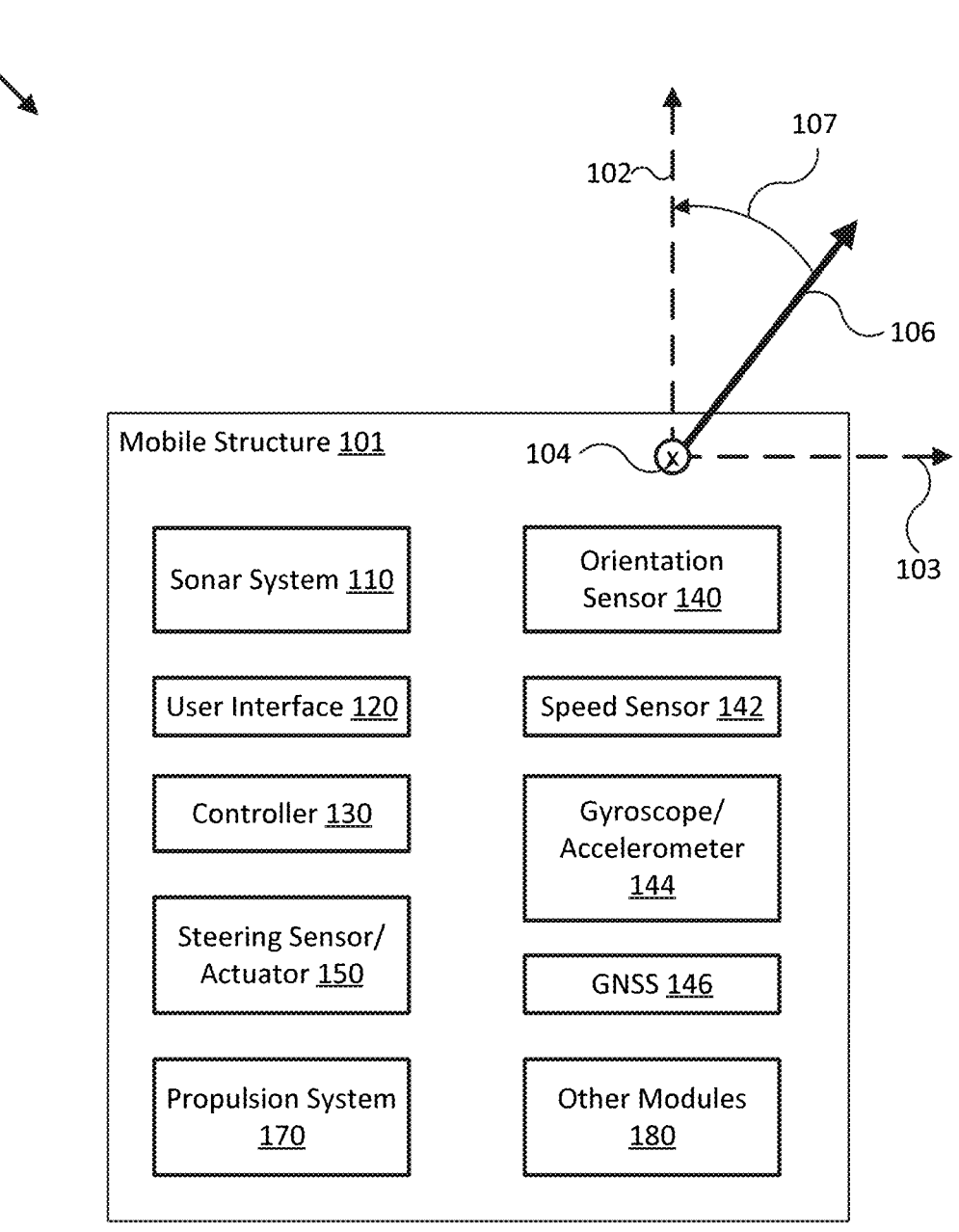
FIG. 1A illustrates a block diagram of a single and/or multichannel sonar system in accordance with an embodiment of the disclosure.

FIG. 1A illustrates a block diagram of system 100 in accordance with an embodiment of the disclosure. In various embodiments, system 100 may be adapted to measure an orientation, a position, an acceleration, and a speed of mobile structure 101 and/or sonar system 110 (e.g., a multichannel sonar system). System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, in the context of sea based sonar, fisherman desire highly detailed and accurate information and/or imagery of underwater structure and mid water targets (e.g., fish). Conventional sonar systems are relatively expensive and bulky and typically cannot be used to provide enhanced underwater views, as described herein. Embodiments of sonar system 110 provide a low cost multichannel sonar system that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, all using the same hardware but with different selectable configurations and/or processing methods, as described herein. In some embodiments, sonar system 110 may be implemented with a single transducer assembly housing incorporating a single and/or multichannel transducer and associated electronics. Such embodiments can reduce overall system cost because, for example, a multi-way interface cable is not needed. Such embodiments may also provide improved image quality by locating transmission and receiver electronics close to their corresponding transmission and receive channels, which can drastically improve signal to noise relative to systems that transmit and/or receive analog signals over long cabling.

In general, embodiments of sonar system 110 may be configured to transmit relatively wide fan-shaped acoustic beams using a single transmission channel and/or element of a multichannel transducer, receive similarly shaped acoustic returns using multiple receive channels and/or elements of the multichannel transducer, and to perform beamforming and/or interferometry processing on the acoustic returns to produce high quality two and/or three dimensional sonar imagery, as described herein. In some embodiments, one or more sonar transmitters of sonar system 110 may be configured to use chirp signals to improve range resolution and hence reduce ambiguities typically inherent in interferometry processing techniques.

In some embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or multichannel transducer for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of waypoints remote from mobile system 101 without having to estimate positions using, for example, water depth and range. Similarly, sonar system 110 may be configured to provide accurate two and/or three dimensional display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a water bed or floor.

In embodiments where sonar system is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of sonar system 110, and controller 130 may be configured to control an actuator and/or otherwise implement the configuration for sonar system 110 (e.g., to set a particular orientation). In another embodiment, controller 130 may be configured to determine water depth and/or altitude and use such data to control an orientation of sonar system 110 to maintain an optimum orientation for the reported depths/altitudes. In yet another embodiment, a user may be searching for fish in a wide area and may select a configuration setting that will adjust a transducer assembly configuration to ensonify a relatively broad, shallow area. In still another embodiment, controller 130 may be configured to receive orientation measurements for mobile structure 101. In such embodiment, controller 130 may be configured to control the actuators associated with the transducer assembly to maintain its orientation relative to, for example, the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/ actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a GNSS and/or global positioning satellite (GPS) receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101 and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
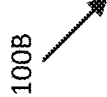
FIG. 1B illustrates a diagram of a single and/or multichannel sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein. In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
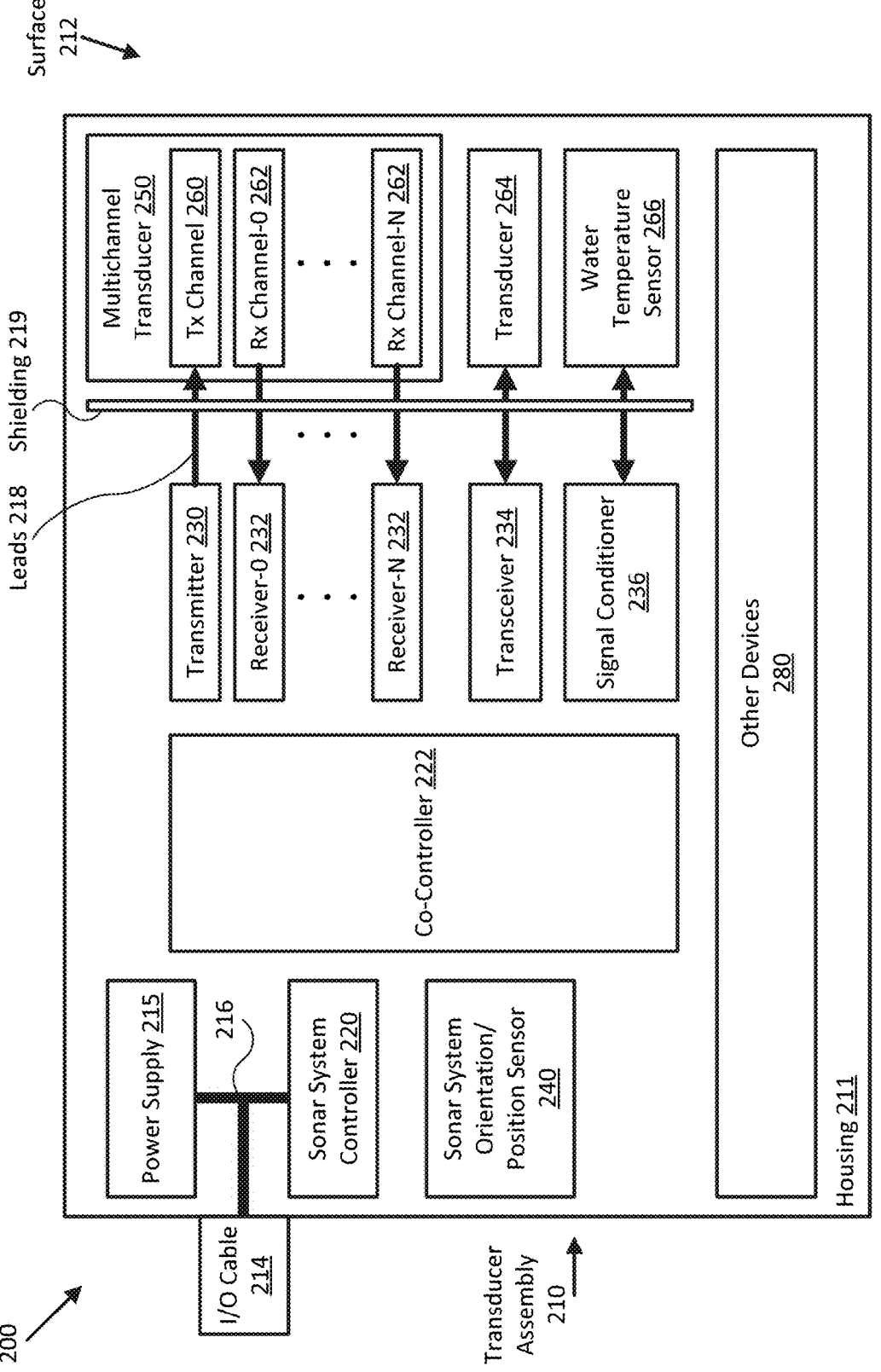
FIG. 2A illustrates a diagram of a single and/or multichannel sonar system in accordance with an embodiment of the disclosure.

FIG. 2A illustrates a diagram of a single and/or multichannel sonar system 200 in accordance with an embodiment of the disclosure. In the embodiment shown in FIG. 2A, multichannel sonar system 200 includes a transducer assembly 210 that can be coupled to a user interface (e.g., user interface 120 of FIG. 1A) and/or a power source through a single I/O cable 214. As shown, transducer assembly 210 may include one or more controllers (e.g., sonar system controller 220 and/or co-controller 222), transducers (e.g., multichannel transducer 250 and/or transducer 264), other sensors (e.g., orientation/position sensor 240 and/or water temperature sensor 266), and/or other devices facilitating operation of system 200 all disposed within a common housing 211. In other embodiments, one or more of the devices shown in FIG. 2A may be integrated with a remote user interface and communicate with remaining devices within transducer assembly 210 through one or more data and/or power cables similar to I/O cable 214.

Controller 220 and/or co-controller 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transducer assembly 210 and/or system 200, for example, similar to controller 130. In typical embodiments, controller 220 may be tasked with overseeing general operation of transducer assembly 210, generating sonar imagery from sonar data, correlating sensor data with sonar data/imagery, communicating operational parameters and/or sensor information with other devices through I/O cable 214, and/or other non-time-critical operations of system 200. In such embodiments, co-controller 222 may be implemented with relatively high resolution timing circuitry capable of generating digital transmission and/or sampling control signals for operating transmitters, receivers, transceivers, signal conditioners, and/or other devices of transducer assembly 210, for example, and other time critical operations of system 200, such as per-sample digital beamforming and/or interferometry operations applied to sonar returns from multichannel transducer 250, as described herein. In some embodiments, controller 220 and co-controller 222 may be integrated together, for example, or may be implemented in a distributed manner across a number of individual controllers.

Transmitter 230 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from co-controller 222 and to generate transmission signals to excite a transmission channel/transducer element of multichannel transducer 250 (e.g., transmission channel 260) to produce one or more acoustic beams. In some embodiments, operation of transmitter 230 (e.g., amplification, frequency dependent filtering, transmit signal frequency, duration, shape, and/or timing/triggering, and/or other signal attributes), may be controlled (e.g., through use of various control signals) by co-controller 222, as described herein.

Each of receivers 232 (e.g., for N channels as shown) may be implemented with one or more analog to digital converters (ADCs), filters, phase adjusters, signal conditioning elements, amplifiers, timing circuitry, logic devices, and/or other digital and/or analog electronics configured to accept analog acoustic returns from a corresponding receive channel/transducer element of multichannel transducer 250 (e.g., receive channels 262), convert the analog acoustic returns into digital acoustic returns, and provide the digital acoustic returns to co-controller 222. In some embodiments, operation of each receiver 232 (e.g., amplification, frequency dependent filtering, basebanding, sample resolution, duration, and/or timing/triggering, and/or other ADC/signal attributes) may be controlled by co-controller 222. For example, co-controller 222 may be configured to use receivers 232 to convert an acoustic return into a digital acoustic return comprising one or more digital baseband transmissions that are then provided to co-controller 222. In some embodiments, receivers 232 may be configured to low-pass or otherwise filter, amplify, decimate, and/or otherwise process the acoustic and/or digital acoustic returns (e.g., using analog and/or digital signal processing) prior to providing the digital acoustic returns to co-controller 222. In other embodiments, receivers 232 may be configured to provide substantially unprocessed (e.g., raw) analog and/or digital acoustic returns to co-controller 222 for further signal processing, as described herein. In further embodiments, transmitter 230 and one or more of receivers 232 may be integrated into a single transceiver.

In the embodiment shown in FIG. 2A, multichannel transducer 250 includes multiple transducer elements and/or transmission/receive channels that may be operated substantially independently of each other and be configured to emit acoustic beams and receive acoustic returns through emission surface 212 of housing 211. In some embodiments, multichannel transducer 250 may include a single transmission channel 260 and, separately, multiple receive channels 262. In other embodiments, multichannel transducer 250 may include multiple transmission channels. In further embodiments, transmission channel 260 may be implemented as both a transmission channel and a receive channel though use of a transceiver (e.g., similar to transceiver 234). In general, transmission channel 260 may be implemented as one, two, or many separate transducer elements configured to produce one or more acoustic beams. Each of receive channels 262 may also be implemented as one, two, or many separate transducer elements, but configured to receive acoustic returns. The effective volumetric shapes of the acoustic beams and acoustic returns may be determined by the shapes and arrangements of their corresponding transducer elements, as described herein. In various embodiments, the various channels of multichannel transducer 250 may be arranged to facilitate multichannel processing, such as beamforming, interferometry, inter-beam interpolation, and/or other types of multichannel processing used to produce sonar data and/or imagery.

For example, in one embodiment, multichannel transducer 250 may be implemented with multiple transmission channels 260 arranged in a phased array to allow electronic steering of relatively narrow acoustic beams (relative to those produced by a single transmission channel 260) within a relatively wide range of transmission angles. In such embodiments, transducer assembly 210 may be configured to use such electronically steered beams to improve signal-to-noise in resulting sonar data and/or imagery and/or to improve rejection of false targets detected in the corresponding acoustic returns. A related and less complex embodiment could be a transmission array implemented without phasing such that the resulting acoustic beam width can be adjusted by including or excluding transmission channels and/or elements. For example, such embodiments could be used to alternate between operation with deep verses shallow water where the acoustic beams could be switched between relatively narrow for deep water and relative wide for shallow water.

In some embodiments, transducer assembly 210 may be implemented with one or more additional transducers (e.g., transducer 264) separate from multichannel transducer 250, and serviced by separate transmitter/receiver electronics similar to transmitter 230 and/or receivers 232 (e.g., transceiver 234, which may include high voltage protection circuitry and/or transmit/receive switching to enable transmission and reception over the same leads 218). In various embodiments, operation of transceiver 234 and/or transducer 264 (e.g., and its constituent transducer elements) may be controlled by co-controller 222, similar to control of transmitter 230 and/or receivers 232 described herein. Typically, transceiver 234 and/or transducer 264 may be configured to produce acoustic beams adapted to reduce or eliminate interference with operation of multichannel transducer 250, such as by using a substantially different transmission frequency, timing, and/or shape, and/or by aiming the acoustic beams in a substantially non-interfering direction. In alternative embodiments, transceiver 234 and/or transducer 264 may be configured to generate acoustic beams that produce acoustic returns in multichannel transducer 250, similar to operation of transmitter 230 and transmission channel 260, but from an oblique angle relative to multichannel transducer 250. In such embodiments, the oblique acoustic returns may be used to generate sonar imagery with increased spatial differentiation and/or contrast between objects in the water column ensonified by transducer assembly 210.

Transducer assembly 210 may include water temperature sensor 266, which may be a digital and/or analog thermometer, sound cell, and/or other analog or digital device configured to measure a temperature of water near emission surface 212 and provide a corresponding sensor signal to signal conditioner 236 and/or co-controller 222. For example, sound velocity and/or attenuation in water is at least partially dependent on water temperature, and so measured water temperatures may be used to determine accurate measurements of spatial displacements (e.g., depths, object dimensions, and/or other spatial displacements) ensonified by transducer assembly 210. Signal conditioner 236 may be one or more ADCs, filters, signal conditioning elements, amplifiers, timing circuitry, logic devices, and/or other digital and/or analog electronics configured to accept sensor signals from water temperature sensor 266, filter, amplify, linearize, and/or otherwise condition the sensor signals, and provide the conditioned sensor signals to co-controller 222. In some embodiments, signal conditioner 236 may be configured to provide reference signals and/or other control signals to water temperature sensor 266 to enable operation of a particular type of water temperature sensor, for example, and may be controlled by co-controller 222.

In FIG. 2A, each of multichannel transducer 250, transducer 262, and/or water temperature sensor 266 are coupled to their electronics over leads 218 and through shielding 219. In various embodiments, leads 218 and/or shielding 219 may be implemented as one or more shielded transmission lines configured to convey analog and/or digital signals between the various elements while shielding the transducers and/or temperature sensor from electromagnetic interference from each other, other elements of transducer assembly 210, and/or external sources. In some embodiments, leads 218 and shielding 219 may be integrated together to form a transmission system. For example, shielding 219 may be configured to provide a ground plane/return for signals conveyed by leads 218. In one embodiment, leads 218 may be implemented as a first conductive ribbon with multiple electrically isolated conductive traces (e.g., one for each channel/sensor), for example, and shielding 219 may be implemented as a second conductive ribbon with one or more relatively wide conductive traces electrically coupled to multiple channels of multichannel transducer 250, transducer 264, and/or water temperature sensor 266.

As shown, transducer assembly 210 may be implemented with sonar system orientation/position sensor 240. Orientation/position sensor 240 may be implemented as one or more orientation sensors, GNSS/GPS sensors, differential GNSS/GPS sensors, orientation/position reference transducers and/or optical sensor (e.g., for actuators), and/or other sensors configured to measure a relative and/or absolute orientation and/or position of transducer assembly 210 and/or multichannel transducer 250 and provide such measurements to controller 220 and/or co-controller 222. In some embodiments, controller 220 and/or co-controller 222 may be configured to combine sonar data and/or imagery according to such measurements and/or measurements of an orientation and/or position of a coupled mobile structure to produce combined sonar data and/or imagery, such as multiple co-registered sonar images, for example, and/or three dimensional sonar images. In other embodiments, controller 220 and/or co-controller 222 may be configured to use orientation and/or position measurements of transducer assembly 210 and/or a coupled mobile structure to control one or more actuators (e.g., other devices 280) to adjust a position and/or orientation of transducer assembly 210 and ensonify a particular position and/or orientation using transducer assembly 210 and/or multichannel transducer 250.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of transducer assembly 210. In some embodiments, other devices 280 may include a visible spectrum camera, an infrared camera, and/or other environmental sensors providing measurements and/or other sensor signals that can be displayed to a user and/or used by other devices of transducer assembly 210 (e.g., controller 220) to provide operational control of transducer assembly 210. In some embodiments, other devices 280 may include one or more actuators adapted to adjust an orientation (e.g., roll, pitch, and/or yaw) and/or a position (longitudinal, lateral, and/or vertical) of transducer assembly 210, multichannel transducer 250, and/or transducer 264, relative to a coupled mobile structure, in response to one or more control signals (e.g., provided by controller 220). In other embodiments, other devices 280 may include one or more brackets, such as a transom bracket, adapted to couple housing 211 to a mobile structure.

In various embodiments, transducer assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between transducer assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of transducer assembly 210.

In various sensor applications, including sonar, radar, and/or other transmission signal-based sensor systems, it is advantageous to be able to control the overall shape of the transmission signal (e.g., a burst of signals). From a processing perspective, shaping the transmission signal can reduce the number and magnitude of artifacts that typically occur along the range direction of the sensor system, which improves the quality and accuracy of resulting imagery and collateral processing, such as reducing false target detection. From a power amplifier design perspective, the shaping can reduce transients and associated issues with component saturation. From an electromagnetic compatibility (EMC) perspective, the shaping can reduce harmonics and associated spurious interference. Switching methods such as pulse width modulation (PWM) or pulse density modulation (PDM) require expensive fast switching components that can introduce unwanted harmonics and otherwise cause degradation in operation of a sensor system.

Figure 2B:
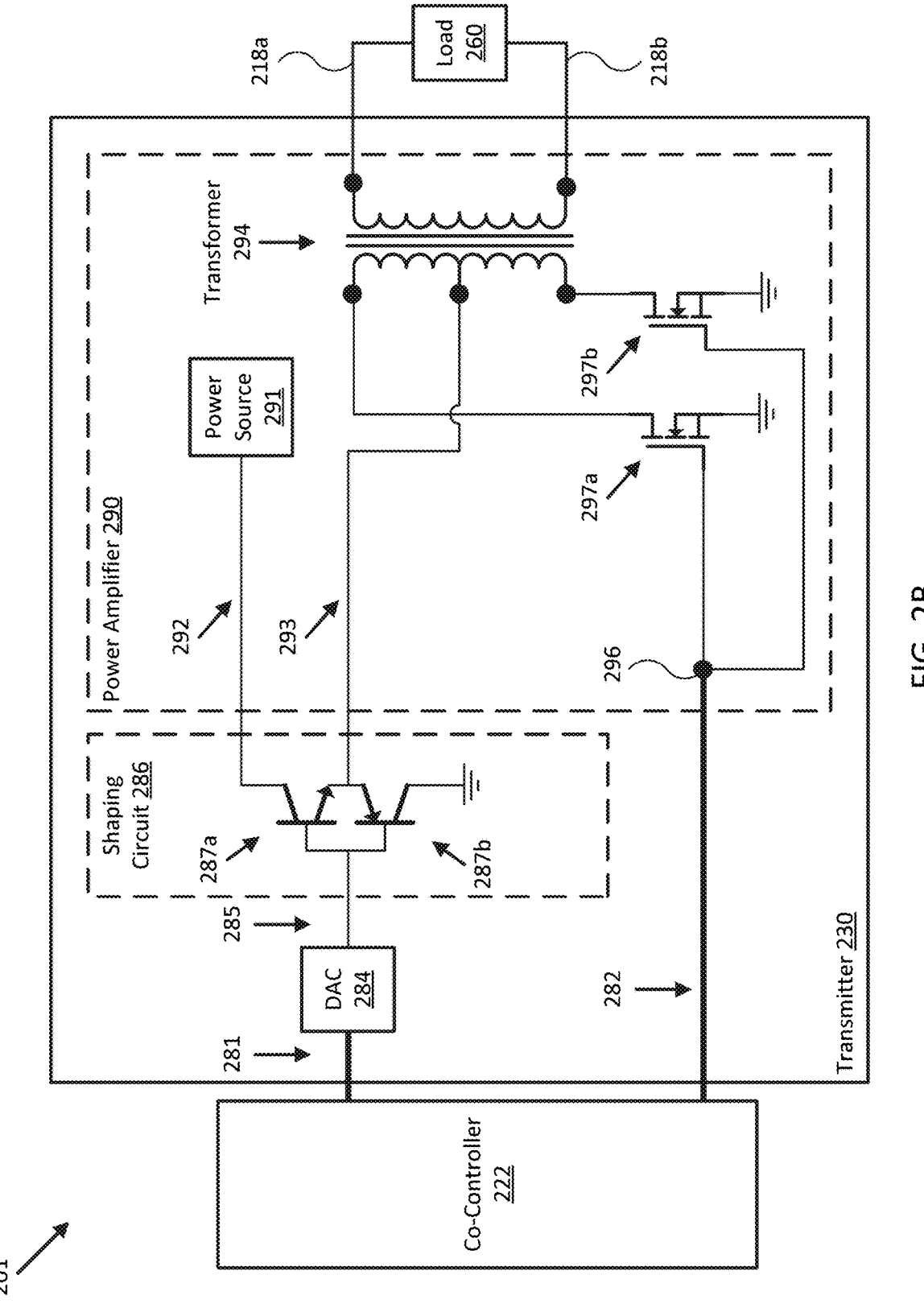
FIG. 2B illustrates a diagram of a sonar transmitter in accordance with an embodiment of the disclosure.

FIG. 2B illustrates a diagram of sonar transmitter 230 configured to implement a digitally controlled method of shaping a transmission signal without a need for fast switching components, in accordance with an embodiment of the disclosure. In the embodiment shown in FIG. 2B, system 201 includes co-controller 222 configured to provide a digital shaping control signal over lead 281, and a transmission control signal over lead 282, to transmitter 230, which in turn is configured to provide a shaped transmission signal to load 260 over leads 218*a-b*.

As shown in FIG. 2B, transmitter 230 may be implemented with shaping circuit 286 (e.g., an emitter follower type circuit) that is operated by co-controller 222 through DAC 284. This arrangement digitally controls the proportion of a reference voltage (e.g., provided by power source 291 over lead 292) that is presented to power amplifier 290 over lead 293 and hence shapes the transmission signal (e.g., corresponding to a transmission control signal provided over lead 282 by co-controller 222).

For example, in general operation, co-controller 222 may be configured to provide two digital control signals to transmitter 230: a digital shaping control signal over lead 281, and a transmission control signal over lead 282. Lead 281 may provide the digital shaping control signal to DAC 284 of transmitter 230, and DAC 284 may be configured to convert the digital shaping control signal to a corresponding analog shaping control signal that is provided to shaping circuit 286 over lead 285. Shaping circuit 286 may be configured to convert a reference voltage (e.g., provided by power source 291 of power amplifier 290) to a shaped voltage corresponding to the analog shaping control signal, for example, and the shaped voltage may be provided to power amplifier 290 over lead 293. Power amplifier 290 may be configured to convert the shaped voltage into a shaped transmission signal corresponding to both the digital shaping control signal and the transmission control signal provided by co-controller 222. Power amplifier 290 may also be configured to provide the shaped transmission signal to load 260 over leads 218*a-b*, as shown.

DAC 284 may be implemented with one or more logic devices, filters, amplifiers, timing circuitry, and/or other digital and/or analog electronics configured to convert the digital shaping control signal to a corresponding analog shaping control signal and provide the analog shaping control signal to shaping circuit 286. In some embodiments, DAC 284 may be configured to use the digital shaping control signal directly to charge one or more capacitors that are then controllably discharged in order to convert the digital shaping control signal into a corresponding analog shaping control signal without reliance on a digital interface between co-controller 222 and DAC 284.

Shaping circuit 286 may be implemented with one or more transistors, filter arrangements, amplifier arrangements, and/or other digital and/or analog electronics configured to receive an analog shaping control signal, convert a reference voltage to a corresponding shaped voltage, and provide the shaped voltage to power amplifier 290. In one embodiment, shaping circuit 286 may be configured to provide current gain and/or act as an analog current amplifier for the analog shaping control signal. For example, shaping circuit 286 may be implemented with one or more bipolar junction transistors (BJTs) arranged in an emitter follower and/or voltage buffer circuit, as shown. In some embodiments, shaping circuit 286 may include NPN BJT 287*a* and PNP BJT 287*b* with coupled emitters and bases, with the bases coupled to receive the analog shaping control signal, one collector coupled to the reference voltage, and the other collector coupled to ground.

Power amplifier 290 may be implemented with one or more power sources, transformers, transistors, and/or other digital and/or analog electronics configured to receive a shaped voltage from shaping circuit 286 and convert the shaped voltage into a corresponding shaped transmission signal. In some embodiments, power amplifier 290 may be implemented with power source 291 configured to supply a reference voltage and sufficient backing current to shaping circuit 286 in order to generate a shaped transmission signal across leads 218*a-b* using the shaped voltage supplied by shaping circuit 286, as described herein.

In one embodiment, power amplifier 290 may include transformer 294 and current switches 297*a-b* all configured to convert a shaped voltage provided over lead 293 and a transmission control signal provided over lead 282 into a corresponding shaped transmission signal. In such embodiments, transformer 294 may be implemented with a primary winding coupled to the shaped voltage and current switches 297*a-b*, and a secondary winding coupled to leads 218*a-b*. The primary and secondary windings may have the same or a different number of windings, for example, and the number of windings may depend on the expected currents and loads and may be configured to maximize the power delivered to load 260. The primary winding may be center tapped, for example, or may be tapped off-center to tune transmitter 230 to maximize the power delivered to load 260, and the tap may be coupled to the shaped voltage as shown. Ends of the primary winding may be coupled to switches 297*a-b*, which may be controlled by co-controller 222 using the transmission control signal provided over lead 282.

In one embodiment, the transmission control signal may include a positive signal component and a negative signal component transmitted on different conductors of lead 282. The different conductors may be split at node 296 and each coupled to control leads of current switches 297*a-b*. In some embodiments, current switches 297*a-b* may be implemented from one or more MOSFETs, such as one or more N-channel inductive channel MOSFETs, for example, and the control leads may correspond to gates of the MOSFETs. In various embodiments, a positive voltage at a control lead of either current switch 297*a-b* causes a first current to pass through the primary winding of transformer 294 from the tap to the top or bottom end and then to ground, and the amount of first current is determined, at least in part, by the shaped voltage provided by shaping circuit 286, as shown and described. The first current induces a second current in the secondary windings that in turn produces a corresponding second voltage across load 260. The amount and polarity of the second current and voltage are determined, at least in part, by the amount and polarity of the first current, which is in turn determined by the shaped voltage and operation of one of current switches 297*a-b*. Thus, when presented with a shaped voltage and a transmission control signal, power amplifier 290 converts the shaped voltage into a shaped transmission signal corresponding to both the digital shaping control signal and the transmission control signal provided by co-controller 222.

Figure 2C:
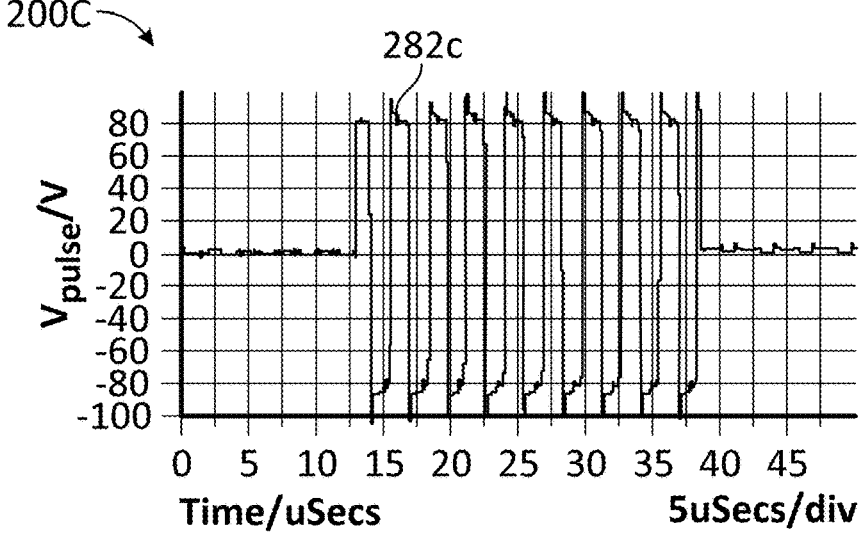
FIG. 2C illustrates various signals of a sonar transmitter in accordance with an embodiment of the disclosure.
Figure 2C:
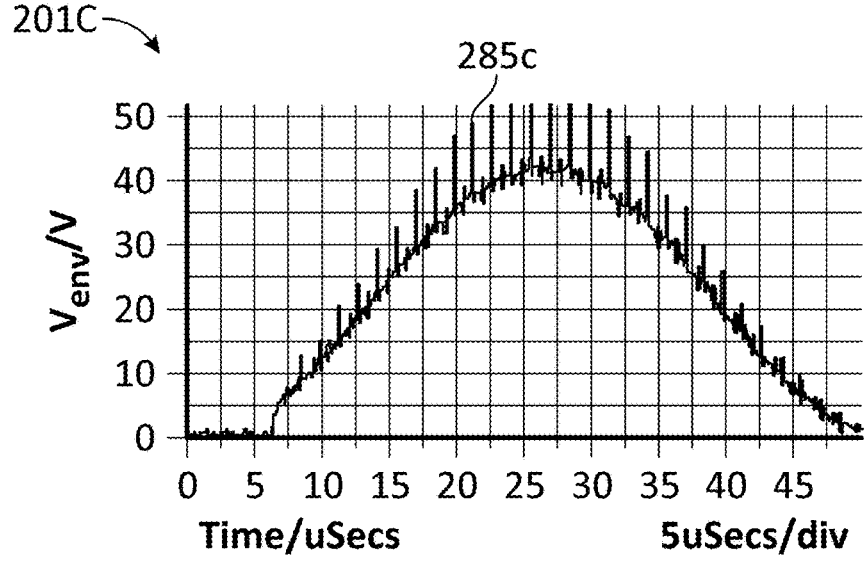
Figure 2C:
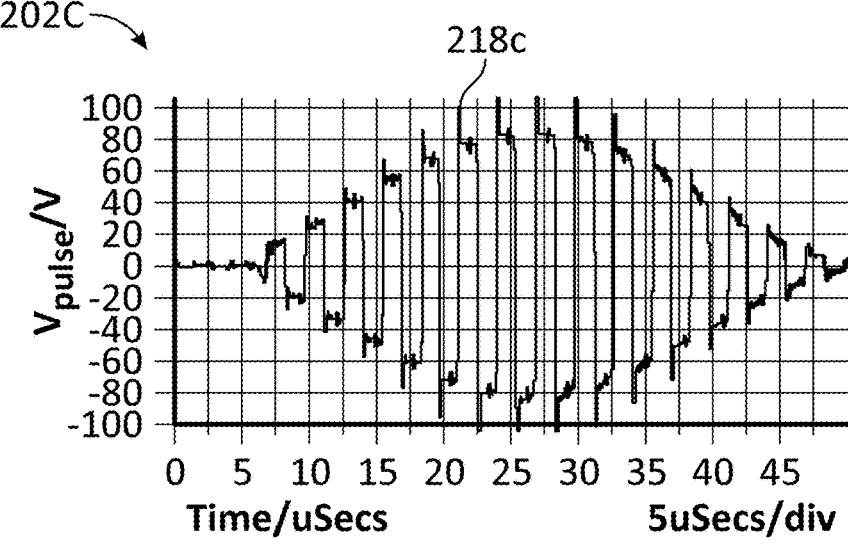

FIG. 2C illustrates various signals of sonar transmitter 230 in accordance with an embodiment of the disclosure. Graphs 200C, 201C, and 202C show simulations of unshaped transmission signal 282*c*, analog shape control signal 285*c*, and shaped transmission signal 218*c*, respectively, where shaped transmission signal 218*c* has been formed using a slow changing envelope (e.g., analog shape control signal 285*c*) relative to the transmission control signal (e.g., corresponding to unshaped transmission signal 282*c*).

In some embodiments, transmitter 230 may be used to excite a transmission channel of multichannel sonar transducer 250, as illustrated in FIG. 2A, and/or may be used to implement a portion of transceiver 234 to excite transducer 264. In other embodiments, transmitter 230 may be used to excite a single sonar, radar, or other type sensor element and/or load, for example, or multiple sensor elements and/or sensor channels. In general, embodiments of transmitter 230 may be used with any type of sensor system that utilizes transmission signals to operate and that would benefit from shaped transmission signals, as described herein. For example, load 260 may be implemented as a sonar transducer, a radar antenna, a transducer and/or antenna array, and/or other loads adapted to accept an electrical transmission signal and produce corresponding sound and/or other types of propagating mechanical and/or electromagnetic pulses or waves.

Figure 3A:
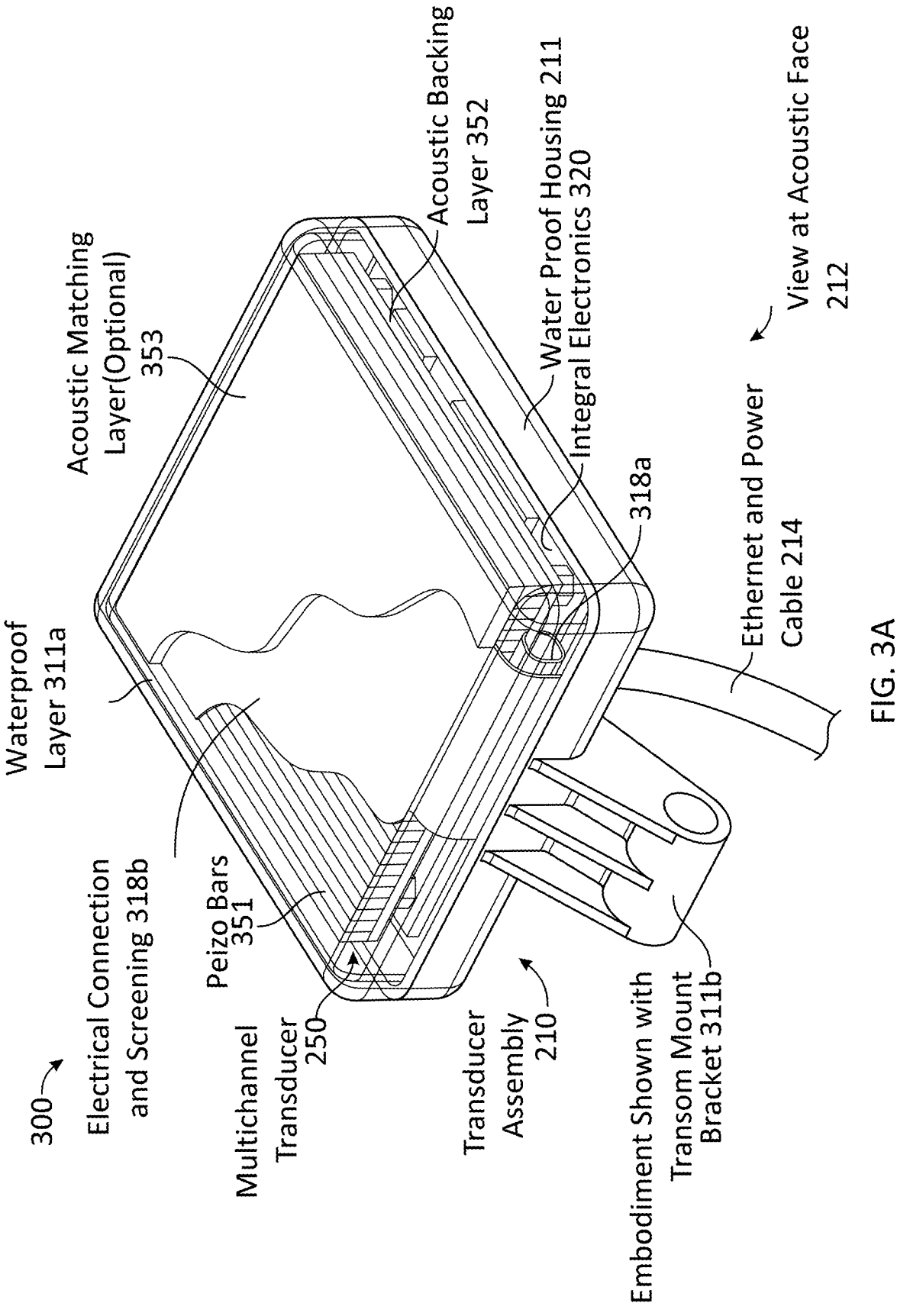
FIGS. 3A-B illustrate diagrams of single and/or multichannel sonar systems in accordance with embodiments of the disclosure.
Figure 3B:
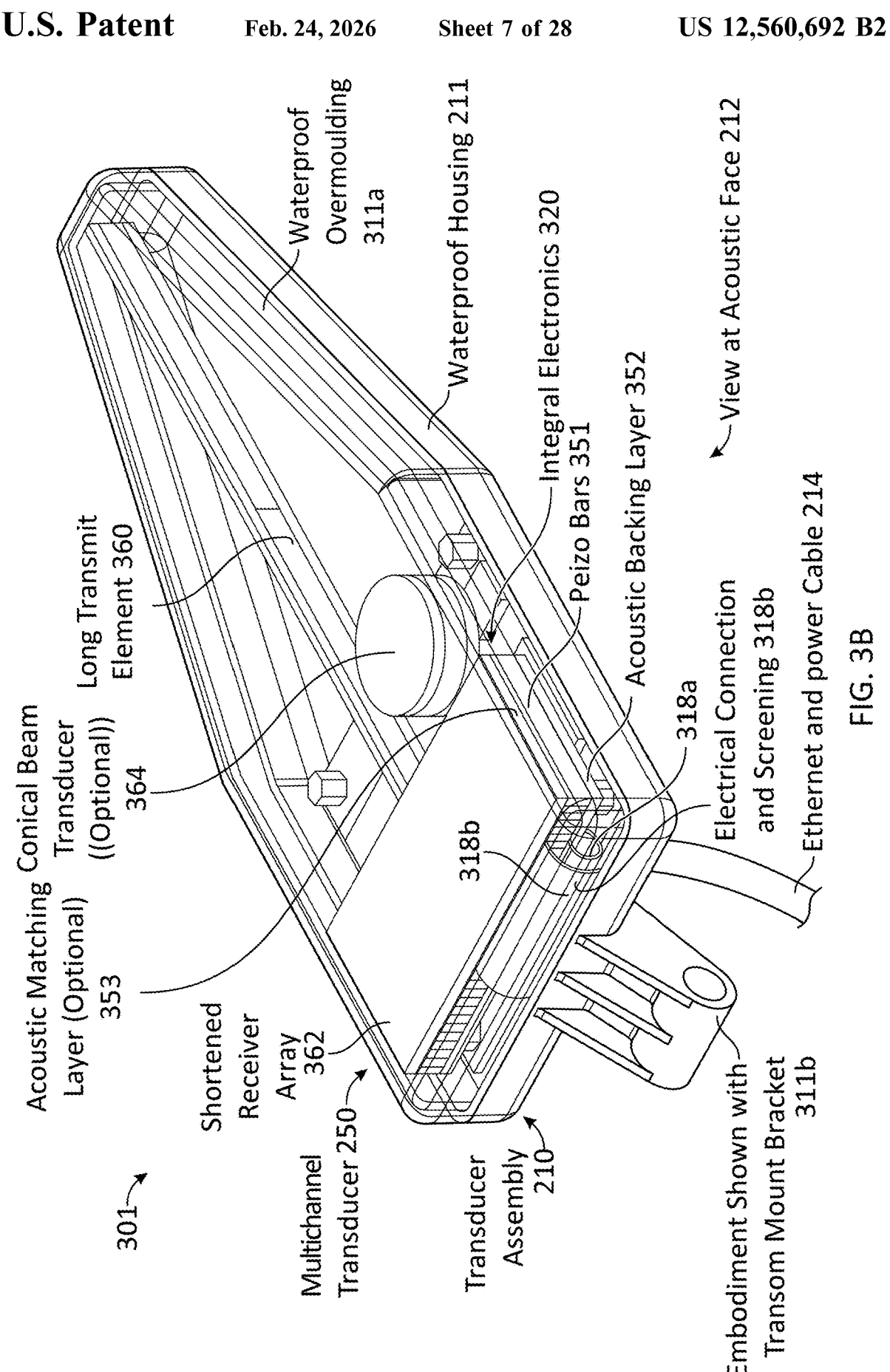

FIGS. 3A-B illustrate diagrams of single and/or multichannel sonar systems in accordance with embodiments of the disclosure. In the embodiment illustrated in FIG. 3A, multichannel sonar system 300 includes transducer assembly 210 with multichannel transducer 250 coupled to additional components (e.g., user interface 120) though cable 214. As shown, in some embodiments, multichannel transducer 250 may be implemented with multiple longitudinally adjacent linear transducer elements 351 coupled to integral electronics 320 (e.g., transmitters, receivers, transceivers, controllers, and/or other electronics) through conductive ribbons 318*a-b*. Each transducer element 351 may, in some embodiments, be implemented from a piezoelectric material and/or formed from one or more electrically coupled piezoelectric bars. Conductive ribbon 318*a* may be implemented with multiple conductive traces (e.g., one per channel), for example, and conductive ribbon 318*b* may be implemented with a single relatively wide conductive plane that may form a ground plane/current return and help to shield linear transducer elements 351 from external electromagnetic interference. In some embodiments, conductive ribbon 318*a* may be adapted to shield linear transducer elements 351 from electromagnetic interference from external sources and from integral electronics 320, such as by using relatively wide conductive traces to substantially cover the opposing face of multichannel transducer 250, for example, and/or by including a separate ground plane trace in addition to the multiple conductive traces coupled to the channels of multichannel transducer 250.

In typical embodiments, the number of transducer elements 351 equals the number of channels of multichannel transducer 250. However, in other embodiments, multiple transducer elements 351 may be electrically coupled to form a single channel. For example, in one embodiment, pairs of adjacent transducer elements may be electrically coupled to form a reduced number of channels in order to reduce electronics complexity and cost, form differently shaped acoustic beams and/or return patterns, and/or conform to other produce design specifications. In some embodiments, conductive ribbons 318*a-b* may be configured to electrically couple multiple transducer elements 351 into a reduced number of channels. In other embodiments, integral electronics 320 (e.g., co-controller 222) may be configured to operate multiple physical channels as a single channel and produce a similar result but without requiring physical changes to integral electronics 320, conductive ribbons 318*a-b*, and/or multichannel transducer 250.

As shown in FIG. 3A, multichannel transducer 250 may be disposed within housing 211 between an optional acoustic matching layer 353 adjacent an acoustic face 212 of transducer assembly 210 and an acoustic backing layer 352. In embodiments including acoustic matching layer 353, acoustic matching layer 353 may be configured (e.g., through selection of shape, thickness, and/or material, including variations in each) to allow multichannel transducer 250 (and transducer assembly 210) to be operated at a much wider frequency band (e.g., transmit and/or receive band) than conventional sonar systems. For example, acoustic matching layer 353 may be formed from a metal or metal oxide filled epoxy (e.g., alumina, stainless steel, copper, and/or other metal and/or metal oxide powder, flakes, microballs, and/or other type of filler). In some embodiments, a thickness of acoustic matching layer 353 may roughly correspond to a quarter-wavelength of the excitation signal (e.g., of a central frequency of the excitation signal) used to generate acoustic beams using multichannel transducer 250.

Acoustic backing layer 352 may be configured to provide structural support for multichannel transducer 250, to help mechanically isolate multichannel transducer 250 from other components of transducer assembly 210, and/or to help shield multichannel transducer 250 from electromagnetic interference. In some embodiments, acoustic backing layer 352 may be formed from a relatively rigid substrate (e.g., fiberglass, other laminates, metal sheet, and/or other rigid substrates) substantially encapsulated in a relatively resilient material (e.g., rubber, foam, and/or other acoustic baffling materials).

As noted in FIG. 3A, in some embodiments, housing 211 may include waterproof layer 311a and/or mount bracket 311b. In some embodiments, waterproof layer 311a may be formed from a polyurethane plastic and/or other types of thermosetting polymers substantially transparent to acoustic signals and able to be overmoulded into and/or around housing 211 and/or multichannel transducer 250. For example, waterproof layer 311a may form acoustic face 212 of transducer assembly 210, for example, and be sealed to remaining portions of housing 211 to form housing 211. In general, housing 211 may be configured to provide structural and/or protective support for transducer assembly 210. In some embodiments, at least some portions of housing 211 may be implemented from a machined, cast, and/or injection moulded material, such as a metal, ceramic, and/or plastic (e.g., a polycarbonate, polyurethane, and/or other plastic) material that can be formed into one or more rigid, pliable, and/or combination of rigid and pliable structures. Mount bracket 311b may be formed from the same or different materials, for example, and may be configured to physically couple transducer assembly 210 to a mobile structure (e.g., transom 107b of mobile structure 101 in FIG. 1B). In some embodiments, mount bracket 311b, housing 211, and/or transducer assembly 210 may be implemented with one or more actuators to adjust an orientation and/or position of transducer assembly 210, as described herein.

In the embodiment illustrated in FIG. 3B, multichannel sonar system 301 includes transducer assembly 210 implemented with multichannel transducer 250 and optional transducer 364. As shown, in some embodiments, multichannel transducer 250 may be implemented with physically differentiated transmission channel 360 and receiver channels 362, so as to differentiate the shapes of the corresponding acoustic beams and acoustic returns, as described herein. In the illustrated embodiment, transmission channel 360 may extend centrally through and beyond receiver channels 362 into an end of housing 211, thereby producing an acoustic beam that is narrower that the acoustic returns for receiver channels 362. Although the beamwidths of receiver channels 362 are wider, the effective system beamwidth would be equal to the narrower beam (e.g., the acoustic beam produced by transmission channel 360). Transmission channel 360 may be formed from one relatively long transducer element, for example, or from multiple relatively short electrically coupled transducer elements in order to reduce differentiated manufacturing costs and/or to reduce a risk of thermal warping and/or related damage.

Also shown in FIG. 3B, transducer assembly 210 may be implemented with optional transducer 364. In various embodiments, transducer 364 may be configured to produce acoustic beams with shapes, orientations, and/or frequencies different from those produced by multichannel transducer 250. For example, transducer 364 may be implemented with a circular transducer element configured to produce relatively narrow conical acoustic beams, for example, to facilitate depth measurements in deep water. In other embodiments, transducer 364 may be configured to produce acoustic beams configured to compliment operation of multichannel transducer 250.

Figure 3C:
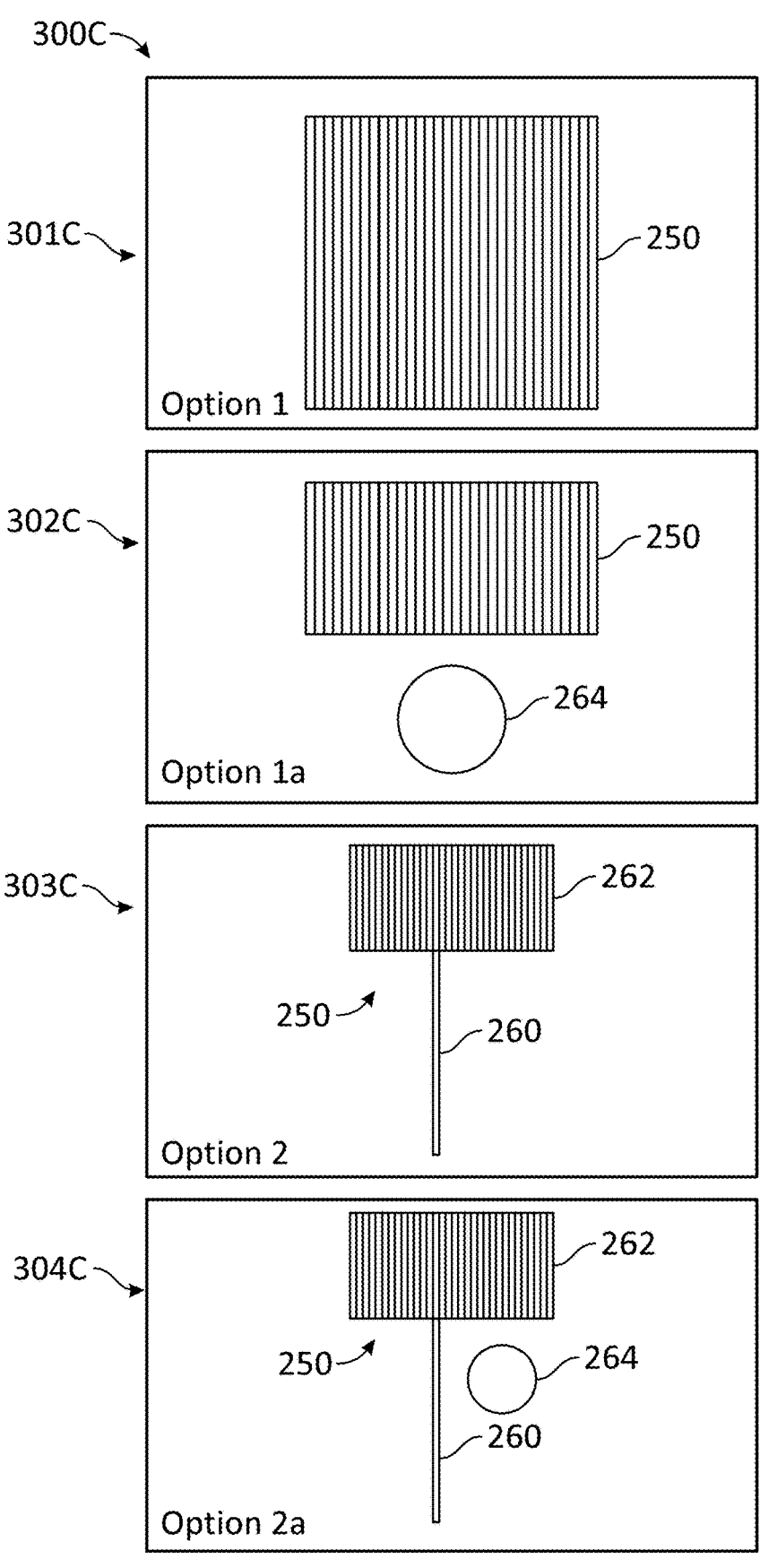
FIGS. 3C-D illustrate diagrams of various transducer configurations for single and multichannel sonar systems in accordance with embodiments of the disclosure.
Figure 3D:
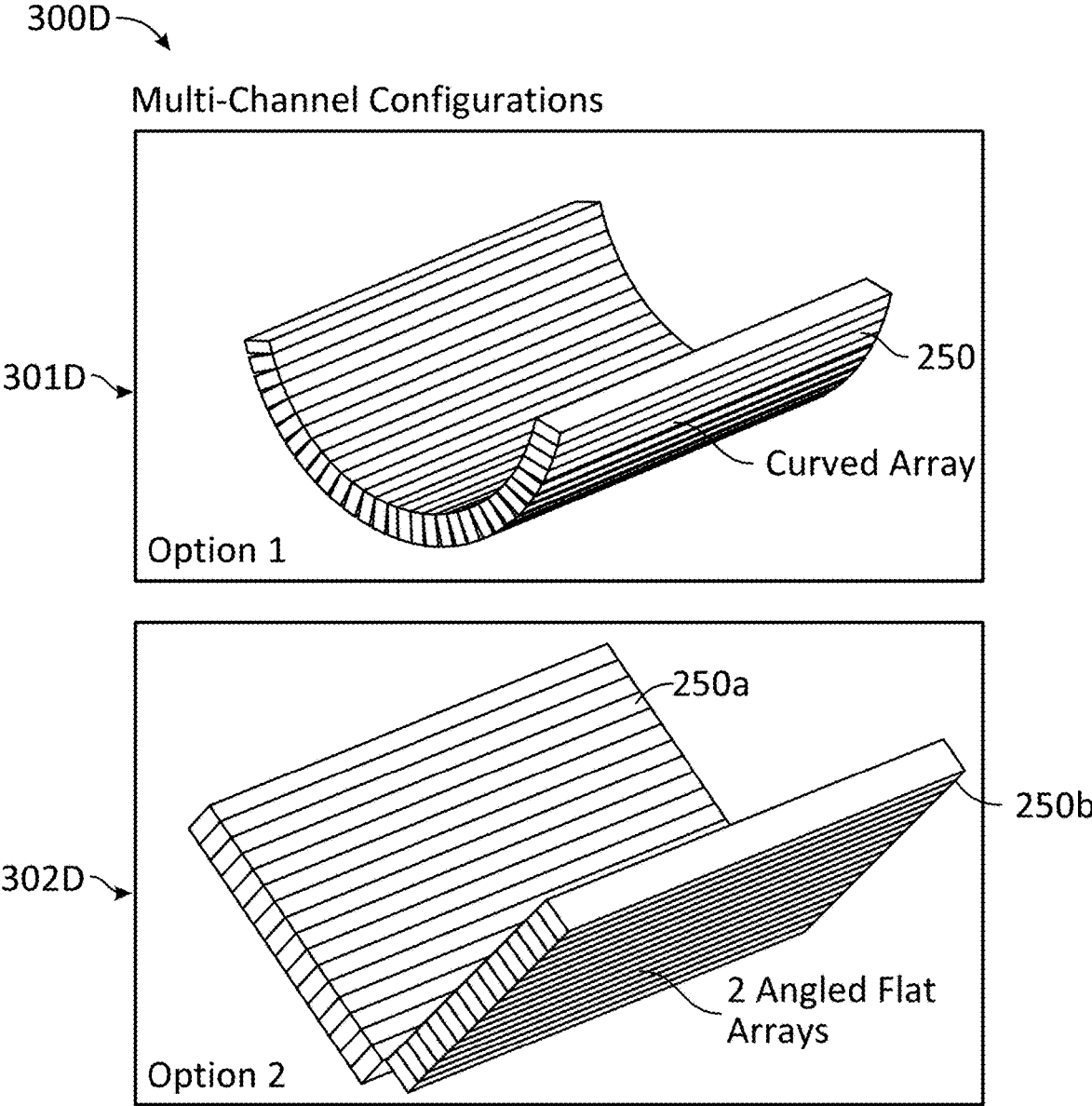

FIGS. 3C-D illustrate diagrams 300C and 300D of various transducer configurations for single and/or multichannel sonar systems in accordance with embodiments of the disclosure. For example, configuration 301C in FIG. 3C includes a single substantially square multichannel transducer 250 with similarly sized linear transmission and receiver channels. Configuration 302C includes a single substantially rectangular multichannel transducer 250 and a circular transducer 264 laterally aligned with a center linear channel of multichannel transducer 250. Configuration 303C includes a single multichannel transducer 250 with an elongated transmission channel 260 relative to receiver channels 262. Configuration 304C includes a single multichannel transducer 250 with an elongated transmission channel 260 relative to receiver channels 262, and a circular transducer 264 offset from both transmission channel 260 and receiver channels 262. Diagrams 300D of FIG. 3D provide embodiments of multichannel transducer configurations adapted to provide additional width of coverage. For example, configuration 301D includes a single multichannel transducer 250 with similarly sized linear and transmission channels, but arranged in a curved array rather than a plane array. Configuration 302D includes two spatially differentiated planar arrays 250a-b, where planar arrays 250a-b are oriented differently and are adjacent and/or adjoining along one edge. In some embodiments, planar arrays 250a-b may form a single multichannel transducer, for example, or may form multiple multichannel transducers.

As described herein, each of these configurations may be implemented with integral electronics and within a single housing of a corresponding transducer assembly. In some embodiments, multiple such embodiments may be formed within a single housing, for example, and/or may be coupled together to form a more complex multichannel sonar system.

Figure 3E:
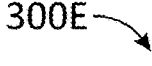
FIG. 3E illustrates various sonar beams produced by multichannel sonar systems in accordance with embodiments of the disclosure.
Figure 3E:
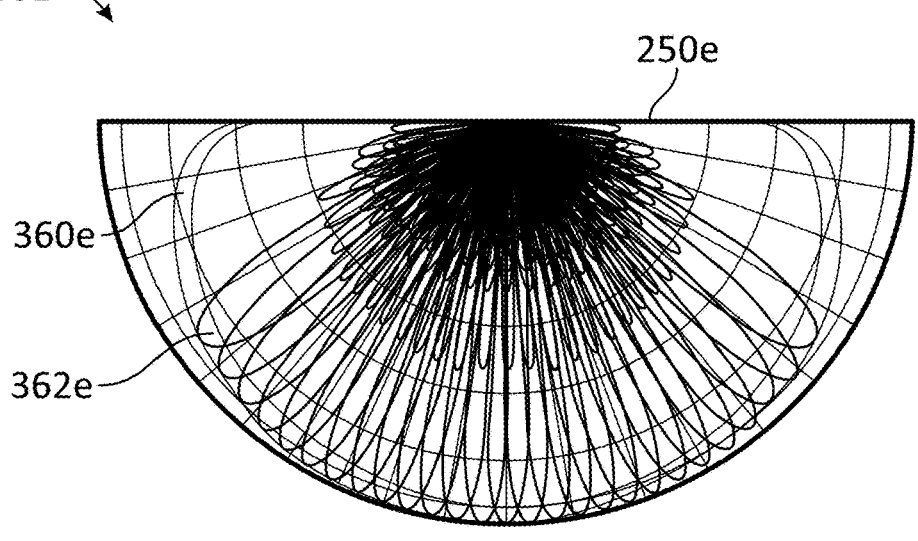
Figure 3E:
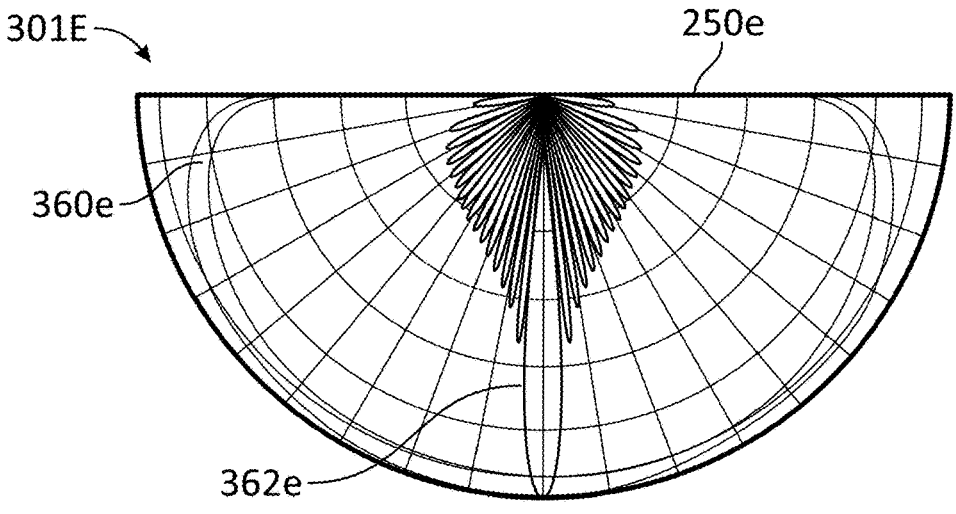
Figure 3E:
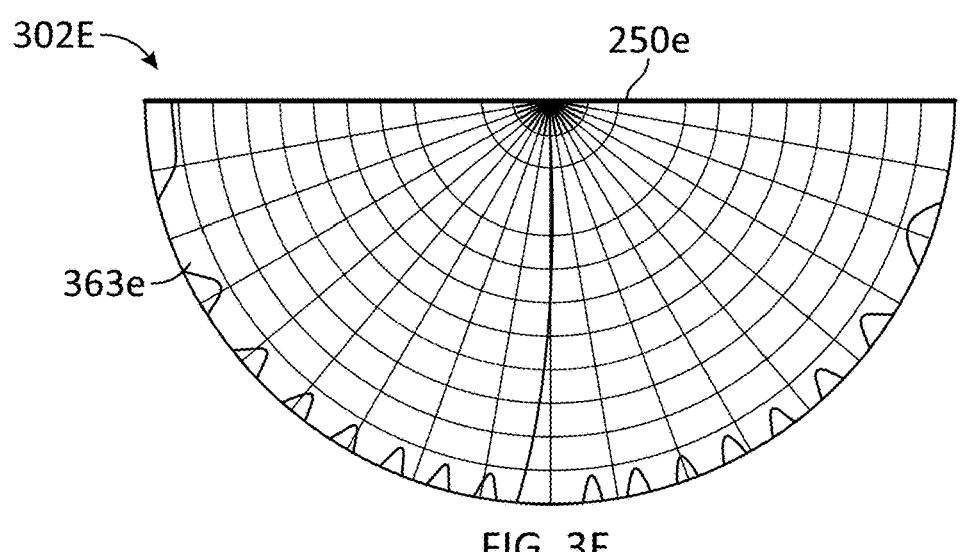

FIG. 3E illustrates various sonar beams produced by multichannel sonar systems (e.g., multichannel transducer 250) in accordance with embodiments of the disclosure. In each of graphs 300E, 301E, and 302E, position 250e indicates a spatial location of a center channel of multichannel transducer 250 relative to the corresponding graph elements, with constituent linear elements longitudinally aligned to extend perpendicularly into and/or out of the page. For example, graph 300E shows transmission beam 360e and return beams 362e corresponding to transmission channel 260 and receive channels 262 of multichannel transducer 250, similar to the arrangement shown in FIG. 3A, with a total of 32 channels and processed to form 27 return beams, as described herein.

As shown in graph 300E, transmission beam 360e is a fan-shaped beam extending laterally with respect to an orientation of transmission channel 260. Each of return beams 362e are sonar return beams formed radially between maximum operating angles within transmission beam 360e by beamforming and/or interferometry processing applied to acoustic returns received by one or more receive channels 262 of multichannel transducer 250. For example, pairs of acoustic returns from corresponding pairs of adjacent receive channels 262 may be processed (e.g., by co-controller 222) to form corresponding return beams for each pair, where each return beam may be characterized by an orientation, shape, and/or one or more beam widths. In some embodiments, three or more receive channels may be used to form each return beam. In various embodiments, return beams 362e (as shown in graph 300E) indicate the spatial equivalents of the programmatically formed beams, and co-controller 222 may be configured to form return beams 362*e* to be narrower and/or oriented differently from the acoustic returns corresponding to a receive channel acting alone (e.g., which would typically have relatively wide fan-shaped patterns similar in dimension, shape, and orientation to transmission beam 360*e*). As shown, in some embodiments, such beamforming and/or interferometry processing can be configured to produce relatively narrow multiple return beams 362 with a range of orientations, which can be used to generate higher resolution and higher quality sonar imagery relative to conventional sonar systems, as described herein.

Graph 301E includes a single sonar return beam 362*e*, which may be formed by processing acoustic returns received by two or more receive channels 262 of multichannel transducer 250, for example. Graph 310E illustrates the effective spatial sensitivity of return beam 362*e* relative to a position and orientation of multichannel transducer 250. Graph 302E includes inter-beam angle conversion basis 363*e*, which may be used to determine accurate signal amplitudes and corresponding relative angles for signal detail received by return beam 362*e* shown in graph 301E and one or more other return beams 362 shown in graph 300E. For example, a signal detail may include a signal spike associated with an object in a water column, and that signal spike may be recognizable in acoustic returns provided by multiple receive channels, but be offset in time due to different signal path lengths. After the acoustic returns are converted into sonar return beams, inter-beam angle conversion basis 363*e* may be used to resolve the position of the object from the signal spikes as reproduced in return beams 362*e*. With one or more such inter-beam conversion bases, acoustic returns received by multiple channels and/or return beams can be more accurately localized to a specific orientation and/or position relative to multichannel transducer 250.

Figure 4A:
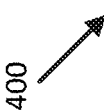
FIG. 4A illustrates a diagram of a cross section of a multichannel sonar system in accordance with an embodiment of the disclosure.

FIG. 4A illustrates a cross section 400 of a transducer assembly 410 (e.g., similar to transducer assembly 210 of FIG. 3A) in accordance with an embodiment of the disclosure. In the embodiment shown in FIG. 4A, transducer assembly 410 includes multichannel transducer 450 configured to emit acoustic beams and receive acoustic returns through surface 412 of housing 411. Integral electronics 420 are configured to control operation of transducer assembly 410 and are electrically coupled to multichannel transducer 450 through traces 418*a* and foil 418*b*, which may be routed, at least in part, through or around acoustic backing layer 452, and through cavities 426, spacers 424, and/or substrate 422. Substrate 422 may be configured to provide structural support for and/or electrical coupling between various elements of integral electronics 420, for example, and, in some embodiments, may be configured to provide thermal sinking for integral electronics 420 to and/or through housing 411. Spacers 424 may be configured to provide structural support for various elements of transducer assembly 410, including substrate 422, integral electronics 420, and/or multichannel transducer 450 for example, and may be configured to help provide mechanical isolation of integral electronics 420 from multichannel transducer 450. In some embodiments, cavities 426 may be filled with a material configured to enhance thermal sinking of integral electronics 420, to increase mechanical isolation of integral electronics 420, and/or to minimize thermal stress within housing 411 caused by thermal cycling of transducer assembly 410, for example.

As shown, multichannel transducer 450 may include multiple transducer elements 451 substantially electrically and/or mechanically isolated from each other and/or a side of housing 411 by spacers 452. In some embodiments, one or more of spacers 452 may be implemented substantially as cavities. Each transducer element 451 may be individually and/or collectively electrically coupled (e.g., soldered, clamped, conductively glued, and/or otherwise electrically coupled) to traces 418*a* and foil 418*b* and thereby to integral electronics 420. In some embodiments, multichannel transducer 450 may include acoustic matching layer 453 disposed adjacent to emission surface 412, which may be configured to broaden an operational bandwidth of multichannel transducer 450.

In some embodiments, transducer assembly 410 may include additional transducers and/or more than one multichannel transducer, for example, and may be arranged differently from the arrangement shown in FIG. 4A. In various embodiments, multichannel transducer 450 may include a different number of transducer elements 451 than shown in FIG. 4A. Each of transducer elements 451 may be implemented as one or more substantially linear and/or conical transducer elements, for example, and be made of a ceramic material, a metal or alloy material, a piezoelectric material, a combination of insulating and conductive materials, and/or other single or multi-layered transducing materials that can be energized by an electrical signal to produce an acoustic beam and/or that can produce electrical signals in response to acoustic returns (e.g., received through emission surface 412).

In one embodiment, one or more of transducer elements 451 may be implemented from polarized polyvinylidene difluoride (PVDF) and/or other thermoplastic polymers. In such embodiment, all transducer elements 451 may be manufactured from a single sheet of the material by forming electrodes into the required shapes and patterns for each transducer element. Such shapes can be rectangular, circular, and/or other patterns, and/or can be formed into shapes or patterns designed to reduce side lobe levels. Once formed, the shaped electrodes may be cut from the sheet and assembled to form transducer elements 451, traces 418*a*, and/or foil 418*b* of multichannel transducer 450, for example, or the entire sheet may be used to form transducer elements 451, traces 418*a*, foil 418*b*, and/or spacers 452, where spacers 452 may be implemented by portions of the material without electrodes.

Figure 4B:
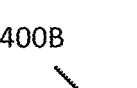
FIGS. 4B-C illustrate diagrams of sonar transducers and corresponding beams for use in a single and/or multichannel sonar system in accordance with embodiments of the disclosure.
Figure 4B:
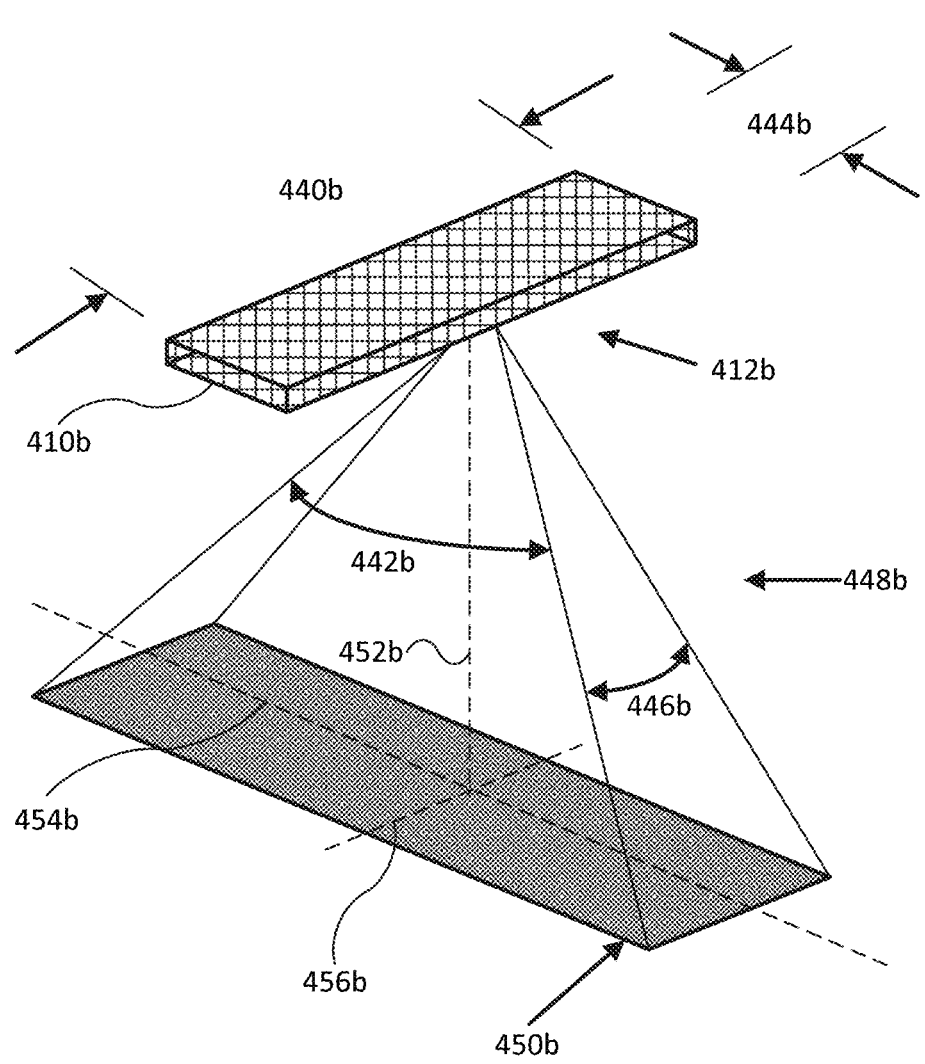
Figure 4C:
Figure 4C:
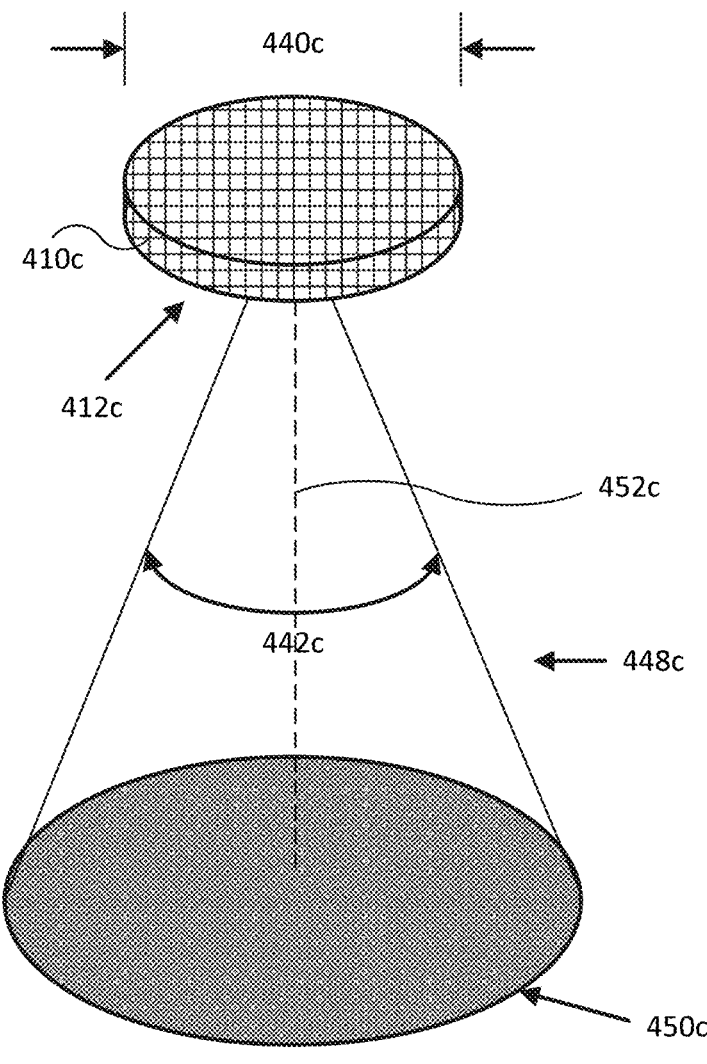

FIGS. 4B-4C illustrate diagrams 400B and 400C of various transducer elements and their corresponding acoustic beams in accordance with embodiments of the disclosure. FIG. 4B shows linear transducer element 410*b* producing a fan shaped acoustic beam 448*b* from emission surface 412*b* having footprint 450*b*, where linear transducer element 410*b* and emission surface 412*b* may correspond to transducer element 451 and emission surface 412 of transducer assembly 410. The overall dimensions and shape of fan shaped acoustic beam 448*b* roughly correspond to the radiation pattern produced by linear transducer element 410*b* as referenced to half power (−3 dB) beamwidth limits of the pattern, as is known in the art. For example, longitudinal length 440*b* (L1) of transducer element 410*b* may be roughly related to the lateral beamwidth 446*b* (B1) by: B1~50*k/L1, and lateral length 444*b* (L2) of transducer element 410*b* may be roughly related to the longitudinal beamwidth 442*b* (B2) by: B2–50*λ/L2, where λ is the wavelength of the signal used to excite transducer element 410*b*. Also shown are center axis 452*b* and orthogonal axes 454*b* and 456*b*, which may be used as references to define an orientation and/or aiming angles of transducer element 410*b* and/or footprint 450*b*, such as a depression/emission angle and/or a roll, pitch, and/or yaw of transducer element 410*b* and/or acoustic beam 448*b*. Acoustic returns received by transducer element 410*b* exhibit a spatial pattern similar to that of the acoustic beam shown in FIG. 4B.

FIG. 4C shows circular transducer element 410C producing a conical acoustic beam 448*c* from emission surface 412*c* having footprint 450*c*, where circular transducer element 410*c* and emission surface 412*c* may correspond to transducer element 451 (e.g., and/or transducer 363 of FIG. 3B) and emission surface 412 of transducer assembly 410. The overall dimensions and shape of conical acoustic beam 448*c* roughly correspond to the radiation pattern produced by circular transducer element 410*c* as referenced to half power (−3 dB) beamwidth limits of the pattern, as is known in the art. For example, diameter 440*c* (D1) of transducer element 410*c* may be roughly related to the beamwidth 442*c* (B1) by: B1~65*λ/D1, where λ is the wavelength of the signal used to energize transducer element 410*c*. Also shown is center axis 452*c*, which may be used as a reference to define an orientation and/or aiming/emission angle of transducer element 410*c* and/or footprint 450*c*, such as a depression angle and/or a roll and/or pitch of transducer element 410*c* and/or acoustic beam 448*c*.

In some embodiments, linear transducer element 410*b* and/or circular transducer element 410*c* may be implemented as a transducer element assembly, for example, including multiple individual transducer elements coupled together electrically and/or physically to act as a single transducer element. For instance, in one embodiment, linear transducer element 410*b* may be implemented as multiple rectangular, circular, and/or otherwise shaped elements soldered together and arranged in a shape roughly corresponding to the shape of linear transducer element 410*b*, so as to collectively produce fan shaped acoustic beam 448*b*. In another embodiment, circular transducer element 410*c* may be implemented as multiple circular, rectangular, and/or otherwise shaped elements soldered together and arranged in an overall shape roughly corresponding to the circular shape of circular transducer element 410*c*, so as to collectively produce conical acoustic beam 448*c*. In such embodiments, interstitial spaces between elements may be filled with a material to help secure the elements to each other and form a transducer element assembly. In one embodiment, the interstitial material may be similar the material used for acoustic matching layer 453.

In various embodiments, the orientation and/or aiming angles, the longitudinal beamwidth 442*b*, lateral beamwidth 446*b*, and/or beamwidth 442*c* may be selected (e.g., by adjusting the orientation and/or angles, by selecting a shape and/or size of linear transducer element 410*b* and/or circular transducer 410*c*, and/or by adjusting the excitation wavelength) to emphasize detail (e.g., narrower acoustic beams and/or smaller excitation wavelengths) in a particular direction, to emphasize breadth of coverage (e.g., broader acoustic beams and/or larger excitation wavelengths) in a particular direction, and/or to emphasize penetration distance (e.g., narrower acoustic beams and/or larger excitation wavelengths), for example, among other sonar system characteristics. Embodiments of the present disclosure provide the ability to adjust such characteristics according to the local environment (e.g., shallow water, deep sea, approach to a shallow submerged object, tracking of a deep school of fish), according to an operational state of a coupled mobile structure (e.g., narrow, forward looking, and quickly updated depth measurements while at speed, broad side and down looking and/or target searching while at rest searching for fish), and/or according to other orientation, position, and/or operational characteristics of a coupled mobile structure.

Figure 5:
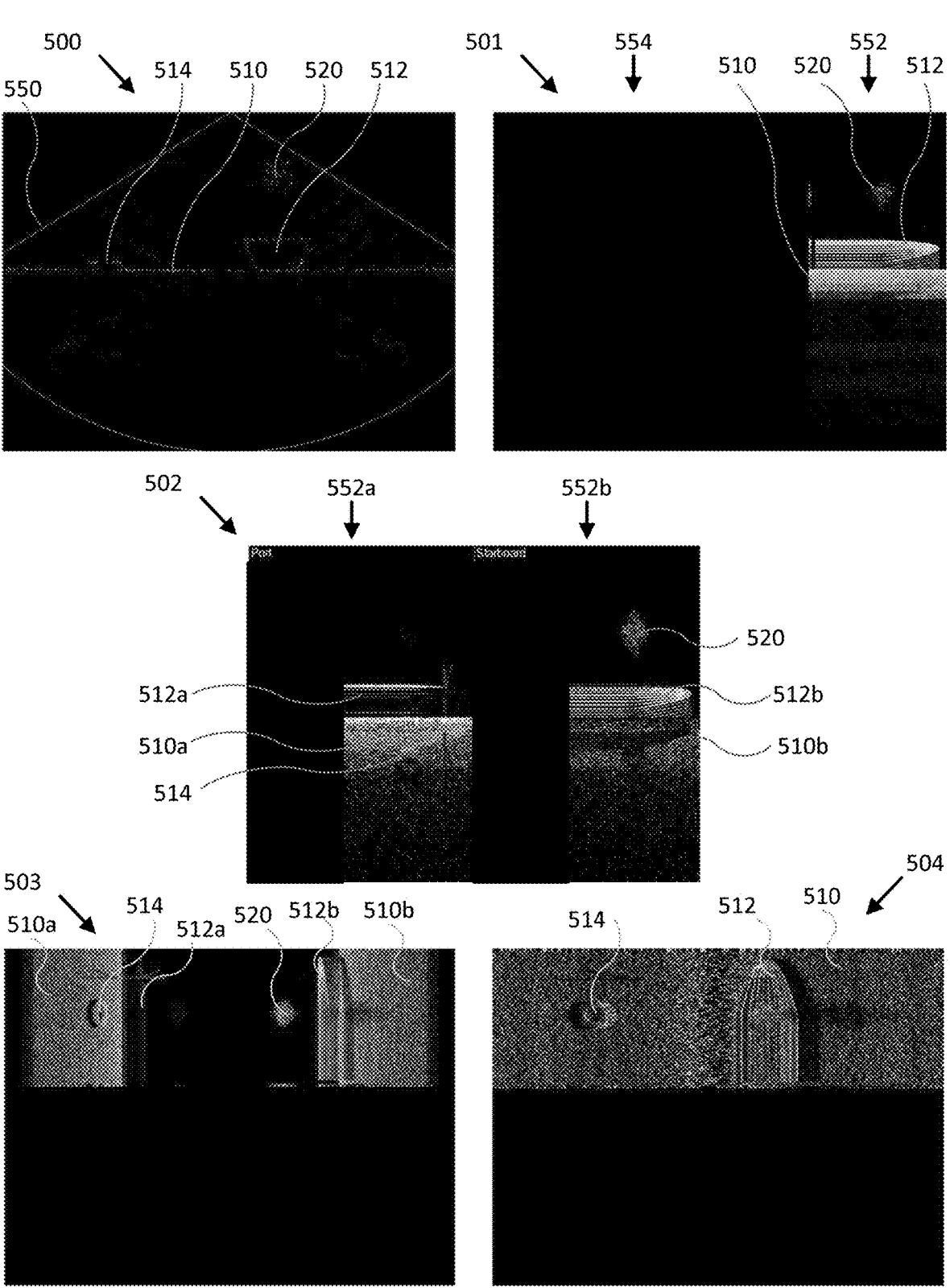
FIGS. 5-7 illustrate various display views of sonar data provided by a single and/or multichannel sonar system in accordance with embodiments of the disclosure.
Figure 6:
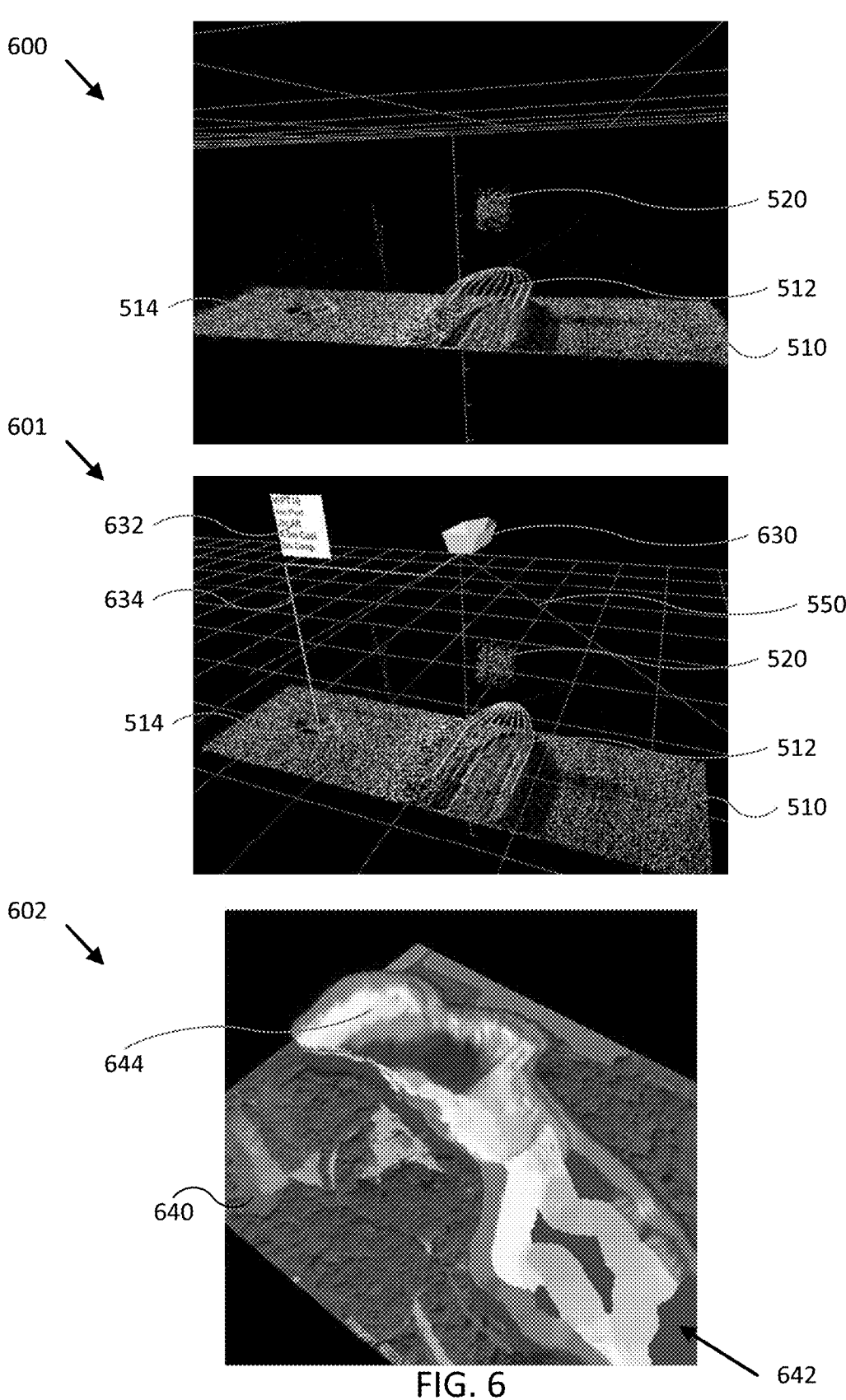
Figure 7:
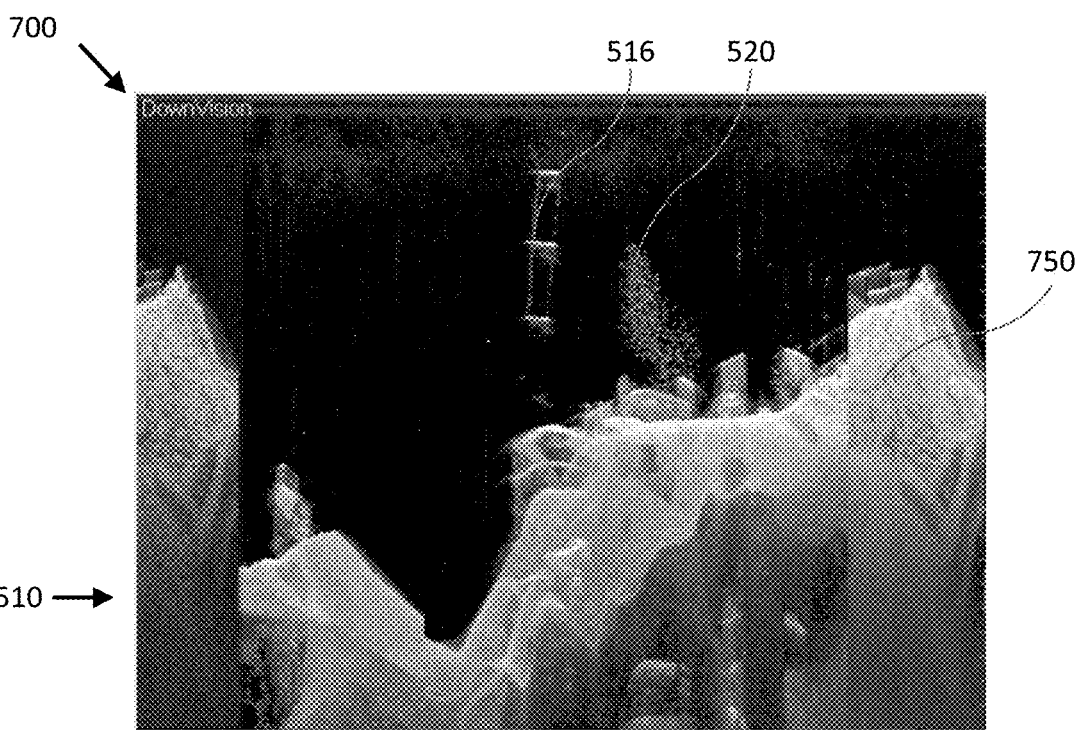
Figure 7:
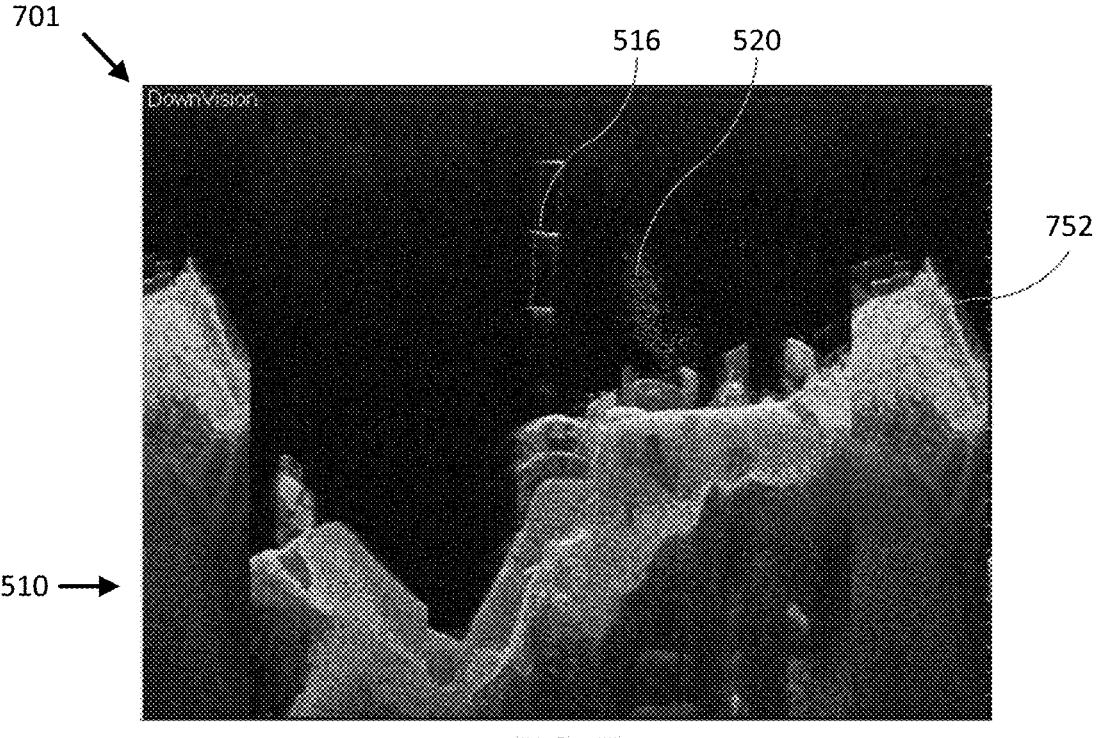

FIGS. 5-7 illustrate various display views of sonar data provided by a single and/or multichannel sonar system in accordance with embodiments of the disclosure. For example, display view 500 of FIG. 5 illustrates an instantaneous side view of a water column and bed ensonified by multichannel transducer 250 and/or transducer assembly 210. As shown, display view 500 includes imagery depicting bed 510, sunken boat 512, tire 514, and school of fish 520, combined with a graphic 550 indicating an outline of a transmission beam/return beam area for multichannel transducer 250. Importantly, display view 500 illustrates how embodiments of multichannel transducer 250 may be used to produce sonar data and/or imagery instantaneously indicating water column and bed characteristics that are differentiated both by their depth and their relative port or starboard position without a central missing trough. Additionally, display view 500 illustrates how embodiments of multichannel transducer 250 may be used to produce sonar imagery of relatively broad areas instantaneously and be detailed enough to detect tire 514 and/or school of fish 520 (e.g., relatively small objects).

In some embodiments, embodiments of the disclosed 3D capable multichannel sonar system (e.g., system 100B of FIG. 1B and/or transducer assembly 210 of FIG. 2A) may be configured to detect an orientation and/or position of mobile structure 101 and/or multichannel transducer 250 and adjust an orientation and/or position of multichannel transducer 250 and/or adjust processing of acoustic returns received by multichannel transducer 250 to substantially align the orientations and/or positions of multiple instantaneous views with each other and/or with a vertical down direction. For example, transducer assembly 210 may be configured to apply a translational and/or rotational coordinate frame transformation to sonar data and/or imagery to align multiple instantaneous views.

Display view 501 of FIG. 5 illustrates an aggregate side view of a water column and bed ensonified by multichannel transducer 250 and/or transducer assembly 210. As shown, display view 501 includes imagery depicting bed 510, sunken boat 512, and school of fish 520, including sampled and un-sampled time series 552 and 554. In some embodiments, display view 501 may be formed from multiple instances of display view 500 rotated 90 degrees about a vertical axis, and may include similar detail and breadth enhancements. For example, port and/or starboard image detail occupying the same position in a rotated display view 501 may be overlaid, blended, and/or otherwise combined in display view 501. In other embodiments, transducer assembly 210 may be configured to form display view 501 by using transmission channel 260 to produce a time series of acoustic beams and only a subset of receive channels 262 (e.g., between one and five channels) to receive a corresponding time series of acoustic returns, and then processing the acoustic returns to produce sampled time series 552, similar to operation of a conventional single channel transducer. In some embodiments, transducer assembly 210 may be configured to substantially align the orientations and/or positions of each sample within sampled time series 552 through physical adjustments and/or processing.

Display view 502 of FIG. 5 illustrates port and starboard differentiated aggregate side views of a water column and bed ensonified by multichannel transducer 250 and/or transducer assembly 210. As shown, display view 502 includes port and starboard sampled time series 552*a-b* depicting port and starboard perspectives of bed 510*a* and 510*b* and sunken boat 512*a* and 512*b*, and port view of tire 514 and starboard view of school of fish 520. In some embodiments, display view 502 may be formed from multiple instances of display view 500 differentiated into port and starboard portions and rotated 90 degrees about a vertical axis. In other embodiments, transducer assembly 210 may be configured to form display view 502 by using transmission channel 260 to produce a time series of acoustic beams and port and starboard subsets of receive channels 262 to receive corresponding time series of port and starboard acoustic returns, and then processing the port and starboard acoustic returns to produce port and starboard sampled time series 552*a-b*. In some embodiments, transducer assembly 210 may be configured to substantially align the orientations and/or positions of each sample within port and starboard sampled time series 552*a-b*.

In related embodiments, transducer assembly 210 may be configured to adjust an effective depression angle and/or range of angles defining the port and starboard perspectives using beamforming and/or interferometry processing, as described herein. For example, display view 502 may be characterized as port and starboard differentiated down perspectives. In some embodiments, transducer assembly 210 may be configured to adjust the effective depression angle and/or range of angles according to a measured depth of the water column, a speed of mobile structure 101, and/or other operational states of transducer assembly 210 and/or mobile structure 101.

Display view 503 of FIG. 5 illustrates port and starboard differentiated aggregate side views of a water column and bed ensonified by multichannel transducer 250 and/or transducer assembly 210, similar to but oriented differently from display view 502. In addition, display view 503 illustration an embodiment where transducer assembly 210 is configured to adjust the effective depression angle and/or range of angles defining the port and starboard perspectives such that display view 503 may be characterized as port and starboard differentiated side perspectives (e.g., similar to conventional sidescan sonar).

As shown, display view 503 includes depicts port and starboard perspectives of bed 510*a* and 510*b* and sunken boat 512*a* and 512*b*, and port view of tire 514 and starboard view of school of fish 520. In some embodiments, display view 503 may be formed from multiple instances of display view 500 differentiated into port and starboard portions and rotated to produce display view 503. In other embodiments, transducer assembly 210 may be configured to form display view 503 by using transmission channel 260 to produce a time series of acoustic beams and port and starboard subsets of receive channels 262 to receive corresponding time series of port and starboard acoustic returns, and then processing the port and starboard acoustic returns to produce display view 503. In some embodiments, transducer assembly 210 may be configured to substantially align the orientations and/or positions of each sample derived from the port and starboard acoustic returns to form display view 503.

Display view 504 of FIG. 5 illustrates an aggregate vertical down view of a water column and bed ensonified by multichannel transducer 250 and/or transducer assembly 210. As shown, display view 504 includes imagery depicting bed 510, sunken boat 512, and tire 514. In some embodiments, display view 504 may be formed from multiple instances of display view 500 rotated 90 degrees about a horizontal axis. For example, different depth image detail occupying the same position in a rotated display view 504 may be overlaid, blended, and/or otherwise combined in display view 504. In other embodiments, transducer assembly 210 may be configured to form display view 504 by using transmission channel 260 to produce a time series of acoustic beams and receive channels 262 to receive a corresponding time series of acoustic returns, and then processing the acoustic returns to produce display view 504. In some embodiments, transducer assembly 210 may be configured to process the acoustic returns using inter-beam interpolation processing, for example, in addition to and/or alternatively to processing the acoustic returns using beamforming and/or interferometry processing. In some embodiments, transducer assembly 210 may be configured to substantially align the orientations of each sample derived from the acoustic returns to form display view 504 through physical adjustments and/or processing. Such processing may be used generally to improve image accuracy and/or aspect ratio, and therein overall image quality.

Display view 600 of FIG. 6 illustrates a three dimensional adjustable perspective view of a water column and bed ensonified by multichannel transducer 250 and/or transducer assembly 210. As shown, display view 600 includes imagery depicting bed 510, sunken boat 512, tire 514, and school of fish 520. In some embodiments, display view 600 may be formed from multiple instances of display view 500 arranged in a volumetric rendering and adjustably rotated to produce display view 600. For example, overlapping image detail in display view 600 may be overlaid, blended, and/or otherwise combined in display view 600. In other embodiments, transducer assembly 210 may be configured to form display view 600 by using transmission channel 260 to produce a time series of acoustic beams and receive channels 262 to receive a corresponding time series of acoustic returns, and then processing the acoustic returns to produce display view 600. In some embodiments, transducer assembly 210 may be configured to process the acoustic returns using inter-beam interpolation processing, for example, in addition to and/or alternatively to processing the acoustic returns using beamforming and/or interferometry processing. In some embodiments, transducer assembly 210 may be configured to substantially align the orientations of each sample derived from the acoustic returns to form display view 600 through physical adjustments and/or processing. Such processing may be used generally to improve image accuracy and/or aspect ratio, and therein overall image quality.

Display view 601 of FIG. 6 illustrates a three dimensional adjustable perspective view of a water column and bed ensonified by multichannel transducer 250 and/or transducer assembly 210. As shown, display view 601 includes imagery depicting bed 510, sunken boat 512, tire 514, and school of fish 520, combined with graphic 550 indicating an outline of a transmission beam/return beam area for multichannel transducer 250, graphic 630 indicating a relative position and/or orientation of mobile structure 101, graphic 632 indicating waypoint information, and graphic 634 indicating an absolute and/or relative position of the waypoint. In various embodiments, display view 601 may be formed using the same or similar techniques as described with respect to display view 600. In addition, transducer assembly 210 may be configured to receive user input (e.g., provided to user interface 120) selecting a position, depth, and/or other characteristics for the waypoint. In some embodiments, transducer assembly 210 may be configured to estimate a range-to-cast from mobile structure 101 to position 634 and use graphic 632 to display the range-to-cast to a user. Such estimate may be based, at least in part, on an absolute and/or relative position of mobile structure 101, a speed of mobile structure 101, and/or other operational states of mobile structure 101. In various embodiments, a range-to-cast estimation may include multiple orthogonal distance estimations, for example, and/or a relative or absolute heading and radius estimation.

Display view 602 of FIG. 6 illustrates a three dimensional adjustable bathymetric view of portions of a water channel or bed ensonified by multichannel transducer 250 and/or transducer assembly 210. As shown, display view 602 includes chart 640 and graphics 644 configured to indicate variable depth along the sonar sweeps 642. In various embodiments, display view 602 may be formed by rendering chart 640, which may include various land features in addition to an outline of a body of water, and rendering point cloud graphics 644 corresponding to acoustic returns received by multichannel transducer 250 as it is moved across sonar sweeps 642. In some embodiments, graphics 644 may be configured to indicate variable depths through differentiated colors, transparency, and/or other types of differentiated graphics characteristics. Portions of a body of water not ensonified by multichannel transducer 250 and/or transducer assembly 210 may be left blank, for example, or may be assigned a color or other graphics characteristic configured to indicate a lack of bathymetric sonar data.

Display views 700 and 701 of FIG. 7 illustrate aggregate side views of a water column and bed ensonified by multichannel transducer 250 and/or transducer assembly 210, similar to display view 501 of FIG. 5. As shown, display views 700 and 701 include imagery depicting bed 510, net 516, and school of fish 520. In various embodiments, display view 700 may be formed using the same or similar techniques as described with respect to display view 501. In such embodiments, portion 750 of display view 700 may include overlaid, blended, or otherwise combined image data that partially or completely obscures port or starboard image detail that lie at the same depth. In some embodiments, transducer assembly 210 may be configured to provide additional image detail by forming display view 701, in which port and starboard data are differentiated graphically, such as through use of differentiated colors (e.g., red for port-side sonar data and green for starboard-side sonar data), as shown in portion 752 of display view 701.

In various embodiments, each of the display views illustrated in FIGS. 5-7 may be formed using the same transducer assembly 210 and/or multichannel transducer 250, for example, and/or approximately the same set of data processed differently by transducer assembly 210 according to user input, configuration parameters, and/or other operational states of transducer assembly 210. This contrasts with conventional sonar transducers which would typically require multiple individual transducer systems, relatively expensive and large transducer assemblies, and multiple processing systems to produce a similar set of perspectives but without the image quality made possible by embodiments of the present disclosure. Additionally, transducer assembly 210 may be configured to render and/or display (e.g. using user interface 120) multiple different display views side by side, for example, and display characteristics and/or arrangements in each of the display views depicted in FIGS. 5-7 may be used in any combination or sub-combination to form different display views with one or more of the described display characteristics and/or arrangements.

Figure 8:
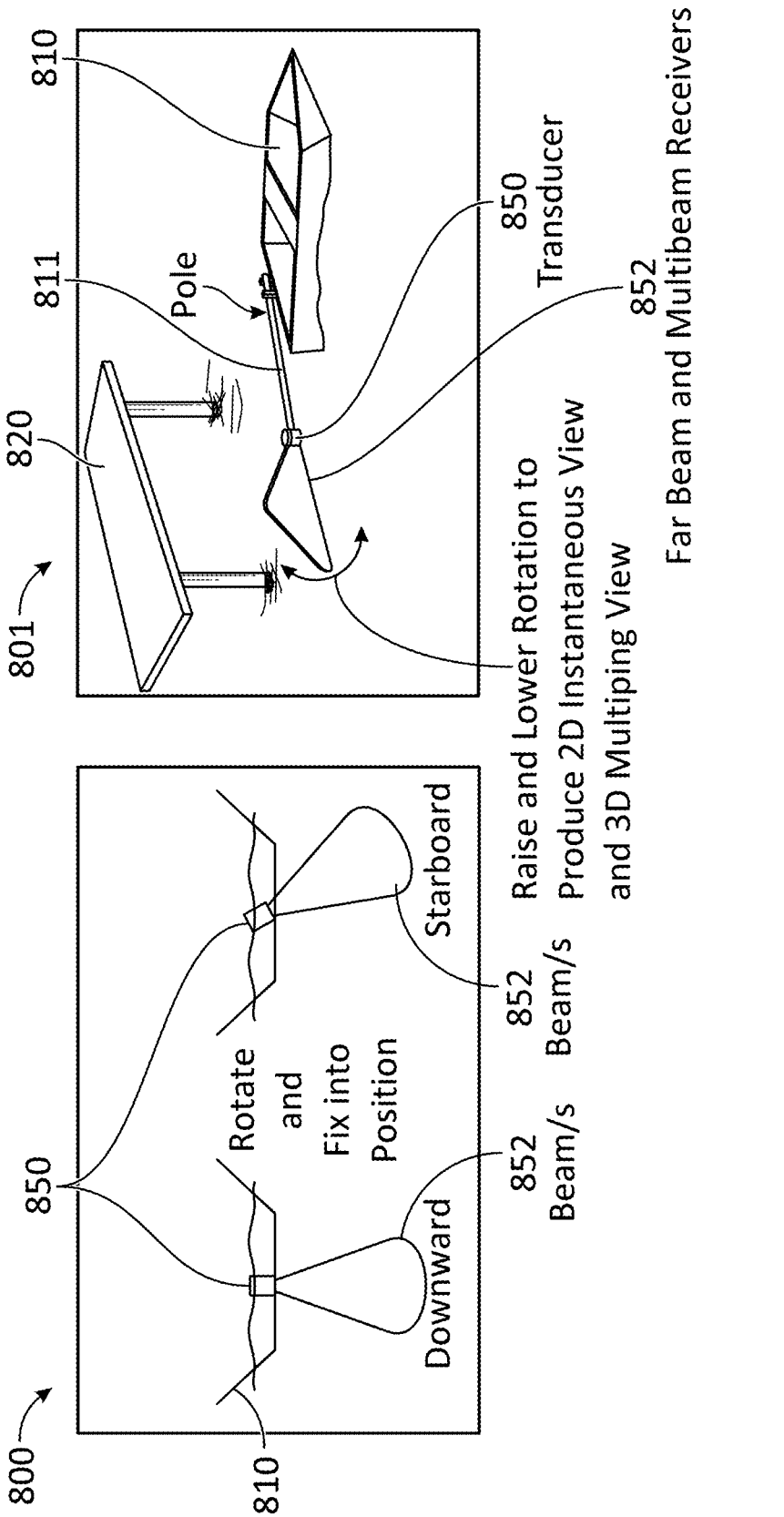
FIGS. 8-9 illustrate various configurations of single and/or multichannel sonar systems in accordance with embodiments of the disclosure.
Figure 8:
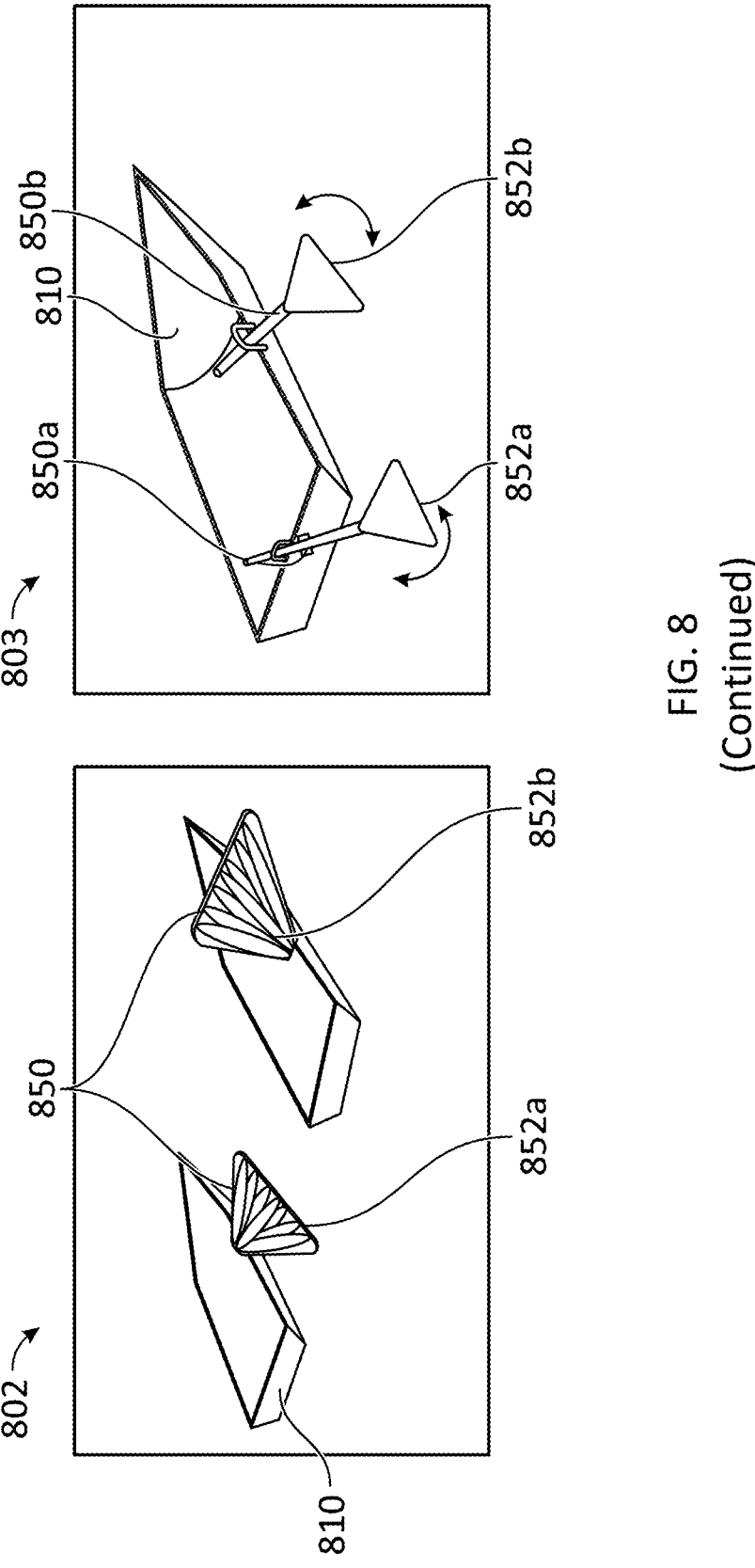
Figure 8:
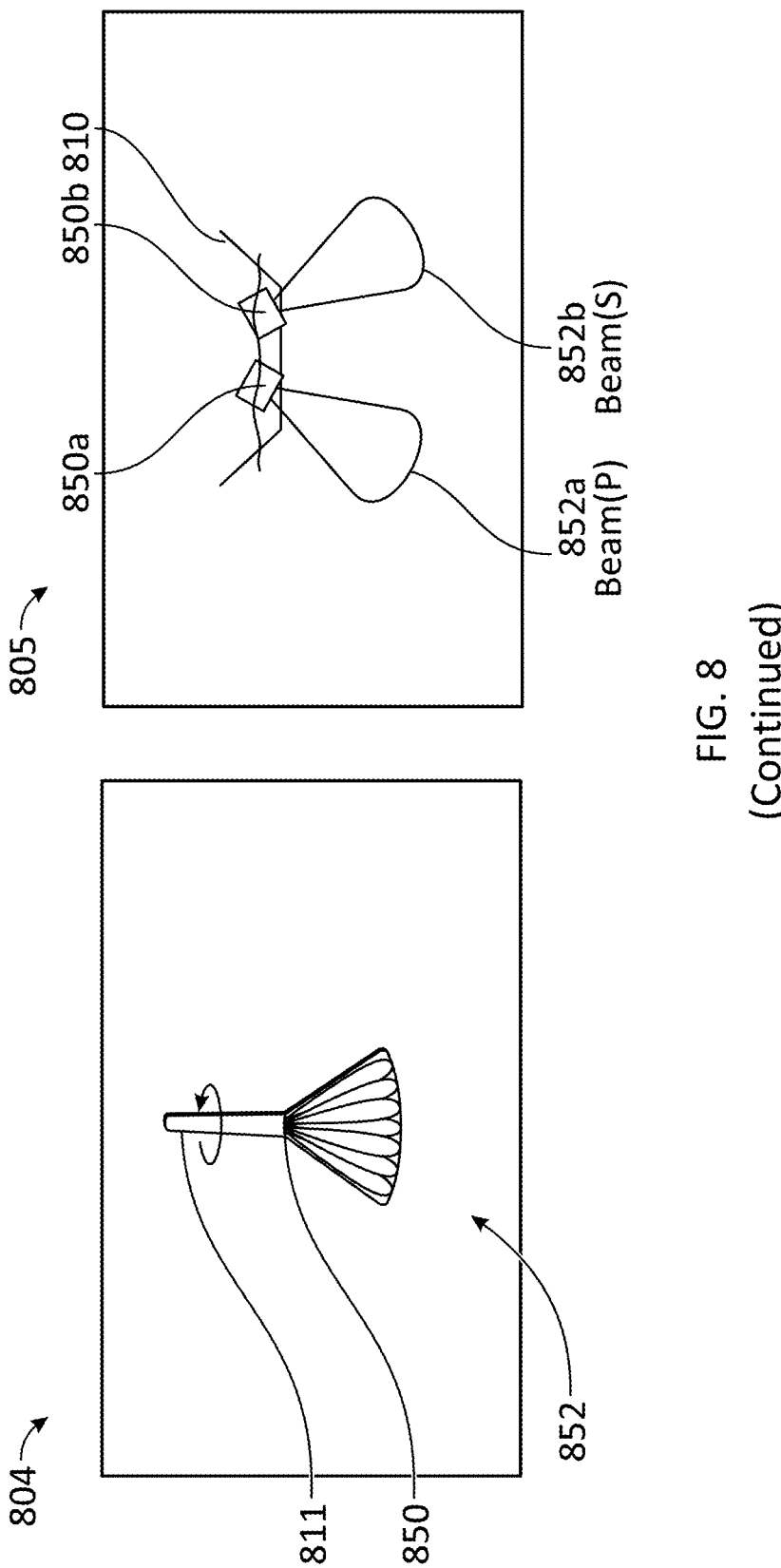
Figure 9:
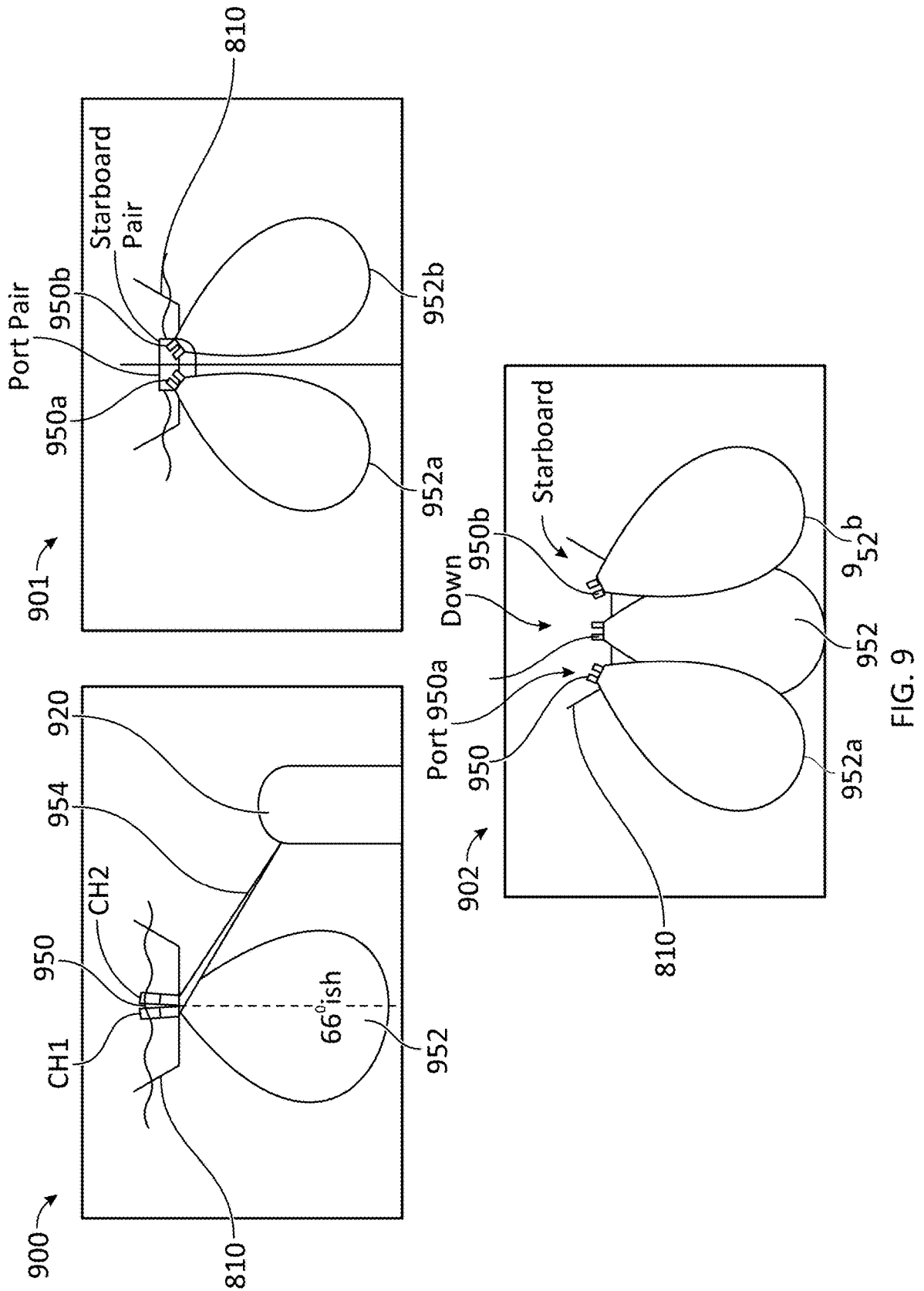

FIGS. 8-9 illustrate various configurations of single and/or multichannel sonar systems in accordance with embodiments of the disclosure. For example, diagram 800 shows ship 810, transducer assembly 850 (e.g., an embodiment of transducer assembly 210 including multichannel transducer

250), and acoustic beam 852 before and after rotation of transducer assembly 850 from a first downward fixed position to a second starboard fixed position. In some embodiments, transducer assembly 850 may be implemented with a bracket (e.g., transom bracket 311*b*) and/or actuators configured to provide adjustment of an orientation of transducer assembly 850, which may be used to rotate transducer assembly 850 about a longitudinal axis to extend ensonification to port or starboard, as shown. For example, one embodiment of transducer assembly 850 may be implemented with a 120 degree beamwidth that limits the extent of its ensonifications to approximately twice the depth to either side of ship 810. By rotating transducer assembly 850, transducer assembly 850 can be used with a bias to port or starboard in order to provide improved sidescan imagery in a corresponding direction. In various embodiments, transducer assembly 850 may be configured to measure an orientation and/or position of transducer assembly 850 while operating, for example, and then use such sensor information to align corresponding samples with each other and/or with a down direction, as described herein.

Diagram 801 shows ship 810, transducer assembly 850 coupled to pole 811, and acoustic beam 852 used to ensonify portions of a water column and/or bed under dock 820. In some embodiments, transducer assembly 850 may be physically coupled to a pole or other type of manual or actuated probe configured to insert transducer assembly 850 into areas where ship 810 cannot easily reach, such as under dock 820 and/or within a submerged tree. Embodiments of the present disclosure make this possibly by providing a relatively compact transducer assembly and/or multichannel transducer. In various embodiments, transducer assembly 850 may be configured to measure an orientation and/or position of transducer assembly 850 while operating, for example, and then use such sensor information to align corresponding samples with each other and/or with a down or other relative or absolute direction to form various display views, including three dimensional display views, as described herein. In one embodiment, transducer assembly 850 may be configured to compare samples and/or images to each other and align the samples/images based on one or more common structures detected in the samples/images.

Diagram 802 shows ship 810, transducer assembly 850 coupled to a front of ship 810, and acoustic beams 852*a* (e.g., a longitudinally aligned acoustic beam) and 852*b* (a laterally aligned acoustic beam) that may be used to ensonify portions of a water column and/or bed under or near a front of ship 810. In some embodiments, transducer assembly 850 may be adjustably coupled to a hull of ship 810 near its bow so as to aid in navigation. In various embodiments, transducer assembly 850 may be configured to measure an orientation and/or position of transducer assembly 850 while operating, for example, and then use such sensor information to align corresponding samples with each other and/or with a down or other relative or absolute direction to form various display views, including three dimensional display views, as described herein. In one embodiment, transducer assembly 850 may be configured to receive a speed of ship 810 and adjust (e.g., using one or more actuators) a depression angle and/or an acoustic beam orientation of transducer assembly 850 (e.g., from acoustic beam 852*a* to 852*b*) to provide further forward imagery as the speed is increased.

Diagram 803 shows ship 810, transducer assembly 850*a* coupled to a transom of ship 810, transducer assembly 850*b* coupled to a starboard side of ship 810, and corresponding laterally aligned acoustic beam 852*a* and longitudinally aligned acoustic beam 852*b*. In some embodiments, transducer assembly 850*a* may be implemented with a bracket (e.g., transom bracket 311*b*), hinge, and/or actuators configured to provide adjustment of an orientation and/or position of transducer assembly 850*a*, which may be used to rotate transducer assembly 850*a* about a lateral axis to sweep acoustic beam 852*a* from the stern surface of the water to the bed, for example, and provide a substantially three dimensional stern view, among other display views described herein. Similarly, transducer assembly 850*b* may be implemented with a bracket, hinge, and/or actuators that may be used to rotate transducer assembly 850*b* about a longitudinal axis to sweep acoustic beam 852*b* from the starboard surface of the water to the bed, for example, and provide a three dimensional starboard view. In various embodiments, transducer assemblies 850*a-b* may be configured to measure their orientations and/or positions while operating and then use such sensor information to align corresponding samples with each other and/or with a down or other relative or absolute direction to form various high quality and aligned display views, including three dimensional display views, as described herein.

Diagram 804 shows transducer assembly 850 coupled to rotating pole 811 and corresponding acoustic beams 852. In some embodiments, transducer assembly 850 may be physically coupled to a pole or other type of manual or actuated probe configured to rotate transducer assembly 850 about a probe axis. In addition, transducer assembly 850 may be implemented with a bracket (e.g., transom bracket 311*b*), hinge, and/or actuators configured to provide adjustment of an orientation and/or position of transducer assembly 850 relative to an end of pole 811. Pole 811 may be used to rotate transducer assembly 850 about a corresponding probe axis to provide radar-like, periodically updated two and/or three dimensional views, for example, among other display views described herein. In various embodiments, transducer assembly 850 may be configured to measure an orientation and/or position of transducer assembly 850 while operating, for example, and then use such sensor information to align corresponding samples with each other and/or with a down or other relative or absolute direction to form various display views, including three dimensional display views, as described herein.

Diagram 805 shows port and starboard transducer assemblies 850*a* and 850*b* coupled to ship 810 and oriented to produce respective port and starboard acoustic beams 852*a* and 85*sb*. In some embodiments, transducer assemblies 850*a* and 850*b* may be oriented to ensonify a larger arc of water column and bed than a single transducer assembly, for example, and/or to provide display views with finer image detail than offered by a single transducer assembly. A 3D capable multichannel sonar system including two or more transducer assemblies (e.g., transducer assemblies 850*a* and 850*b*) may be configured to time ensonifications of each assembly in a coordinated fashion, for example, to synchronize ensonifications (e.g., to reduce a risk of electrical interference) and/or to stagger or otherwise pattern (e.g., spatially and/or temporally)) ensonifications to reduce a risk of acoustic interference. Such timing may be implemented over an interface supported by cable 214 and/or controllers 220 and/or 222, for example. In one embodiment, such timing may be implemented according to the IEEE 1588 Precision Timing Protocol. In various embodiments, transducer assemblies 850*a* and 850*b* may be configured to measure their orientations and/or positions while operating, for example, and then use such sensor information to align corresponding samples with each other and/or with a down or other relative or absolute direction to form various display views, including three dimensional display views, as described herein.

FIG. 9 illustrates various configurations of a limited (e.g., with two channels) multichannel embodiment of transducer assembly 210 and multichannel transducer 250. Such embodiments would not produce sonar imagery with as much of the detail provided by embodiments with additional channels, but such embodiments could be configured to provide rough angular information that is not available with conventional single channel sonar systems. For example, conventional single channel sonar systems produce sonar imagery that is a combination of acoustic returns from all sides of the ship/transducer, meaning a user would not know on which side an imaged target of interest lies. A transducer assembly implemented with a two channel multichannel transducer may be configured to use interferometry and/or time of arrival processing to discriminate targets closer to one channel than another, for example, and in some embodiments provide a user with an indication of the true range to the target from the ship. Such systems could be implemented inexpensively, as compared to alternative systems with many more channels, for example, and need not be configured to perform certain processing steps, such as beamforming processing.

For example, diagram 900 of FIG. 9 shows transducer assembly 950 (e.g., implemented with a two channel multichannel transducer) coupled to ship 810, target 920, acoustic beam 952, and differentiated return paths 954. As shown, return paths 954 from target 920 to transducer assembly 950 are slightly different for the two channels of transducer assembly 950, and transducer assembly 950 may be configured to detect that difference and determine a corresponding side (e.g. starboard) for samples including acoustic returns from target 920. In some embodiments, transducer assembly 950 may be configured to use one or both channels as combined transmission and receive channels, as described herein. In other embodiments, transducer assembly 950 may additionally include a separate transmission channel. In further embodiments, a transducer assembly implemented with a many channel multichannel transducer may be configured to operate with only two channels, similar to transducer assembly 950. In various embodiments, transducer assembly 950 may be configured to measure its orientation and/or position and then use such sensor information to align corresponding samples with each other and/or with a down or other relative or absolute direction to form various display views, including three dimensional display views, as described herein.

Diagram 901 shows multiple transducer assemblies 950*a* and 950*b* (e.g., both implemented with a two channel multichannel transducer) coupled to ship 810, and corresponding acoustic beams 952*a* and 952*b*. Diagram 902 shows transducer assemblies 950, 950*a*, and 950*b* of diagrams 900 and 901 coupled to ship 810, and corresponding acoustic beams 950, 952*a*, and 952*b*. Diagrams 901 and 902 illustrate how multiple two channel transducer assemblies can be combined with a single mobile structure to provide port and starboard, or port, starboard, and down ensonifications and thereby increase the coverage of the associated water column and/or bed. In various embodiments, transducer assemblies 950, 950*a*, and/or 950*b* may be configured to measure their orientations and/or positions and then use such sensor information to align corresponding samples with each other and/or with a down or other relative or absolute direction to form various display views, including three dimensional display views, as described herein.

Figure 10A:
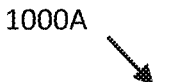
FIG. 10A illustrates a flow diagram of various operations to operate a single and/or multichannel sonar system in accordance with an embodiment of the disclosure.
Figure 10A:
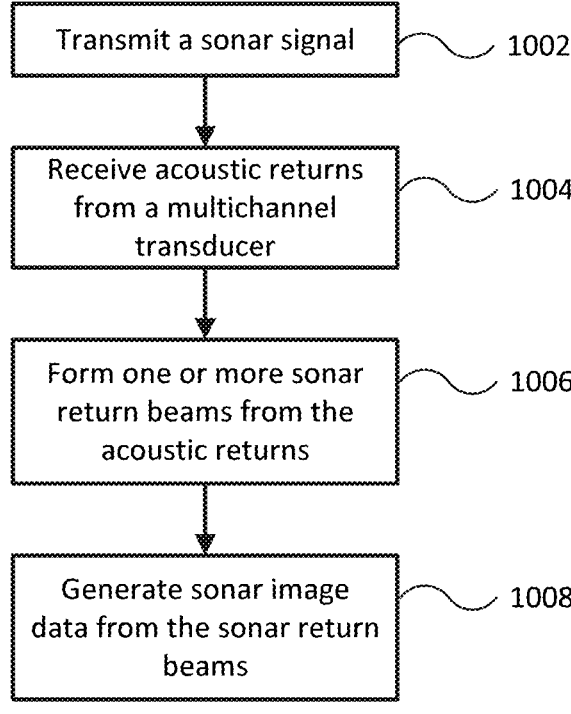

FIGS. 10A-B illustrate flow diagrams of respective processes 1000A and 1000B to provide sonar data and/or imagery for mobile structure 101 in accordance with embodiments of the disclosure. In some embodiments, the operations of FIGS. 10A-B may be implemented as software instructions executed by one or more logic devices associated with corresponding electronic devices, sensors, and/or structures depicted in FIGS. 1A through 4C. More generally, the operations of FIGS. 10A-B may be implemented with any combination of software instructions and/or electronic hardware (e.g., inductors, capacitors, amplifiers, actuators, or other analog and/or digital components).

It should be appreciated that any step, sub-step, sub-process, or block of processes 1000A and 1000B may be performed in an order or arrangement different from the embodiments illustrated by respective FIGS. 10A-B. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although processes 1000A and 1000B are described with reference to systems 100, 100B, 200, 201, 300, 301, and/or 400 and FIGS. 1A-4C, processes 1000A and 1000B may be performed by other systems different from those systems and including a different selection of electronic devices, sensors, assemblies, mobile structures, and/or mobile structure attributes.

Process 1000A represents a method for providing sonar data and/or imagery for mobile structure 101 using systems 100, 100B, 200, 201, 300, 301, and/or 400 in accordance with embodiments of the disclosure. At the initiation of process 1000A, various system parameters may be populated by prior execution of a process similar to process 1000A, for example, or may be initialized to zero and/or one or more values corresponding to typical, stored, and/or learned values derived from past operation of process 1000A, as described herein.

In block 1002, a logic device transmits a sonar signal. For example, controller 220 and/or co-controller 222 of transducer assembly 210 may be configured to control transmitter 230 to provide a shaped or unshaped transmission signal to transmission channel 260 of multichannel transducer 250 and produce a corresponding acoustic beam. In some embodiments, controller 220 and/or co-controller 222 may be configured to control transceiver 234 to provide a shaped or unshaped transmission signal to transducer 264 and produce a corresponding acoustic beam. In various embodiments, transducer assembly 210 may be configured to use temperature sensor 266 and/or orientation/position sensor 240 to record corresponding measurements at substantially the same time. Notification of transmission and/or other sensor information may be relayed to other devices of system 100 through cable 214.

In block 1004, a logic device receives acoustic returns from a multichannel transducer. For example, controller 220 and/or co-controller 222 may be configured to control one or more of receivers 232 to receive acoustic returns from one or more of receive channels 262 of multichannel transducer 250, for example, and provide the received acoustic returns (e.g., in digital form) to co-controller 222. In other embodiments, controller 220 and/or co-controller 222 may be configured to control transceiver 234 to receive acoustic returns from transducer 264 and provide the received acoustic returns (e.g., in digital form) to co-controller 222. In some embodiments, receivers 232 and/or transceiver 234 may be configured to convey the acoustic returns to co-controller 222 over a baseband channel. In other embodiments, receivers 232, transceiver 234, and/or co-controller 222 may be configured to decimate the acoustic returns before performing further processing. In various embodiments, transducer assembly 210 may be configured to use temperature sensor 266 and/or orientation/position sensor 240 to record corresponding measurements at substantially the same time. Notification of reception and/or other sensor information may be relayed to other devices of system 100 through cable 214.

In block 1006, a logic device forms one or more sonar return beams from the acoustic returns. For example, controller 220 and/or co-controller 222 may be configured to perform beamforming, interferometry, and/or inter-beam interpolation processing on the acoustic returns received in block 1004 to form the one or more sonar return beams. In some embodiments, such processing may be performed on acoustic returns grouped from two, three, or more receive channels, for example, depending on the desired number of beams, the desired range of beam orientations, and/or other system configuration parameters. In various embodiments, controller 220 and/or co-controller 222 may be configured to determine an inter-beam angle conversion basis for each sonar return beam, which may be used to determine accurate return beam signal amplitudes as a function of the angle for each sonar return beam, as described herein. In some embodiments, controller 220 and/or co-controller 222 may be configured to decimate, scale, filter, and/or otherwise process or post-process the sonar return beams before storing the amplitudes, inter-beam angles, and/or other characteristics of the sonar return beams (e.g., for each sample) and proceeding to block 1008. Notification of processing and/or other sensor information may be relayed to other devices of system 100 through cable 214.

In block 1008, a logic device generates sonar image data from the sonar return beams. For example, controller 220 and/or co-controller 222 may be configured to process the individual sonar return beams (e.g., according to their corresponding orientation angles and/or signal amplitudes) into depth (e.g., time from transmission to reception), position (e.g., orientation angle for the sonar return beam), and/or intensity (e.g., signal amplitude) sonar data, for each sample. Controller 220 and/or co-controller 222 may be configured to convert such sonar data and/or samples into two dimensional and/or three dimensional sonar imagery and/or display views, as described herein. In some embodiments, controller 220 and/or co-controller 222 may be configured to use corresponding recorded temperature, orientation, and/or position measurements to align acoustic returns, samples, sonar data, and/or imagery with each other and/or one or more directions, such as down. Sonar data, imagery, display views, and/or other sensor information may be relayed to other devices of system 100 (e.g., user interface 120) through cable 214. In some embodiments, transducer assembly 210 may be configured to display sonar data, imagery, display views, and/or other sensor information to a user through use of user interface 120, for example, such as receiving user selection of a desired display view and then relaying corresponding sonar data and/or imagery to user interface 120.

It is contemplated that any one or combination of methods to provide sonar data and/or imagery may be performed according to one or more operating contexts of a control loop, for example, such as a startup, learning, running, and/or other type operating context. For example, process 1000A may proceed back to block 1002 and proceed through process 1000A again to produce updated sonar data and/or imagery, as in a control loop.

Process 1000B represents a method for providing sonar data and/or imagery for mobile structure 101 using systems 100, 100B, 200, 201, 300, 301, and/or 400 in accordance with embodiments of the disclosure. At the initiation of process 1000B, various system parameters may be populated by prior execution of a process similar to process 1000B, for example, or may be initialized to zero and/or one or more values corresponding to typical, stored, and/or learned values derived from past operation of process 1000B, as described herein.

In block 1010, a logic device receives sonar image data from a multichannel sonar system. For example, controller 220 of transducer assembly 210 may be configured to receive sonar image data generated by co-controller 222 in communication with multichannel transducer 250, similar to the process described in block 1008 of process 1000A. In various embodiments, controller 220 may be configured to receive an orientation and/or position of transducer assembly 210 with the sonar image data.

In block 1012, a logic device receives an updated orientation and/or position of a multichannel transducer system. For example, controller 220 may be configured to receive an absolute and/or relative orientation (e.g., roll, pitch, and/or yaw) and/or position from an orientation/position sensor integrated with transducer assembly 210 (e.g., orientation/position sensor 240), bracket 311b, and/or assembly bracket/actuator 116. In various embodiments, the measured transducer orientation may be derived from one or more absolute and/or relative orientation measurements made by orientation sensors, actuators, stepper motors, and/or other devices coupled to mobile structure 101. In some embodiments, the updated measurements may be received substantially synchronously with processing of block 1014.

In block 1014, a logic device receives updated sonar image data from a multichannel sonar system. For example, controller 220 may be configured to receive updated sonar image data generated by co-controller 222 in communication with multichannel transducer 250 at a subsequent time relative to processing of block 1010. In various embodiments, the updated sonar image data may be generated using a process similar to process 1000A.

In block 1016, a logic device combines sonar image data and updated sonar image data based on an updated orientation and/or position. For example, controller 220 may be configured to combine the sonar image data received in block 1010 with the updated sonar image data received in block 1014 based on the updated orientation and/or position measurements received in block 1012. In various embodiments, controller 220 may be configured to user the sensor measurements to align the sonar image data with the updated sonar image data and/or align both to a particular direction (e.g., down) accurately, as described herein. In some embodiments, controller 220 may be configured to align the sonar image data using common image detail. Resulting imagery may be two dimensional and/or three dimensional, as described herein.

In block 1018, a logic device displays the combined sonar image data. For example, controller 220 may be configured to relay the combined image data to user interface 120 to display the combined image data to a user of mobile structure 101. In some embodiments, controller 220 may be configured to render one or multiple different display views of the combined image data, for example, and relay the display views and/or corresponding sonar image data to user interface 120.

It is contemplated that any one or combination of methods to provide sonar data and/or imagery may be performed according to one or more operating contexts of a control loop, for example, such as a startup, learning, running, and/or other type operating context. For example, process 1000B may proceed back to block 1010 and proceed through process 1000B again to produce updated sonar data and/or imagery, as in a control loop.

Embodiments of the present disclosure can thus provide inexpensive, feature-filled, reliable, compact, and accurate sonar systems, data and/or imagery. Such embodiments may be used to provide sonar data to assist in navigation and/or mapping for a mobile structure and/or to assist in the operation of other systems, devices, and/or sensors coupled to the mobile structure.

When generating reconstructions of a 3D underwater scene using sonar systems, there are often competing requirements for the sonar data. For example, it may be better to use a lower frequency to detect the underwater bottom surface, while a higher frequency may provide better detection of objects protruding from the bottom. Therefore, for an enhanced rendering of the bottom surface in an underwater scene, it can be advantageous to use different sources of sonar data, each of which may be selected to be better suited for the task of generating and/or rendering the bottom surface and/or other aspects of the underwater scene.

Embodiments described herein enhance the rendering of the bottom surface by using one source of sonar data for the generation of the surface structures and other sonar data and/or other data sources to enhance the rendering of the surface. Examples of the data sources are sidescan sonar systems/subsystems, a ranging system or geographical map or underwater camera or combinations of such sensors and/or data sources.

For example, such sonar systems may be configured to take sonar data and corresponding position data and optionally attitude data to generate a 3D representation of an underwater scene; create a 2D rectangular grid that overlays the 3D scene with fixed coordinates in the horizontal plane, but with adjustable coordinates in the vertical plane; separate the echo returns associated with the bottom features and those that correspond to targets in the water; working with the echo returns from the bottom features, apply sonar data to the grid such that each echo return contributes to the closest vertex of the grid and the closest pixel in the texture; convert the grid to a 3D surface by generating triangles for cells in the grid that have vertices with contributing echo returns; plot the surface in a 3D underwater scene; generate a high-resolution texture, from sources of data such as a sidescan sonar system or subsystem, a ranging system, a geographical map, an underwater camera, or combinations of such data sources; register such textures with the 3D surface and stretch over the triangles; repeat for new sonar data but update only the triangles that have changed or been added; and/or extend this technique to multiple grids so that a continuous track can be represented, and/or any combination of these.

More specifically, embodiments may take sonar data and position data and optionally attitude data to generate a 3D representation of an underwater scene in a point cloud format; separate the echo returns associated with the bottom features and those that correspond to targets in the water; define a grid in the XY plane (e.g., longitudinal/lateral plane) with a fixed resolution in meters (e.g., the cell size) that is defined by the currently selected range, which has a fixed extent in grid cells either side of the first ensonification center; aggregate new data for echo returns associated with the bottom to provide the depths (e.g., Z/vertical coordinates for the grid vertices); and subdivide cells with defined depths by triangles generated to represent the surface of the bottom and structures attached to the bottom. In some embodiments, another source of data may be provided, such as sidescan sonar data from a sidescan sonar subsystem, or a ranging system or geographical map or underwater camera or combinations of these, and the system may be configured to generate a texture or textures that extends over the grid, such that the texture stores the intensities and/or depths at a higher resolution than the grid and thus provides a higher resolution image of the bottom structure. Such texture(s) can also be used to show visual data, such as visual data acquired from an underwater camera. In various embodiments, the texture may be registered with the grid (e.g., using knowledge of the orientation of the sensors and sonar system elements) and aligned over the 3D representation XY grid, and the resulting 3D sonar data may be rendered on a display to a user such that the user may re-orientate the scene using a graphical interface provided by the display (e.g., an elements of user interface 120).

Figure 11B:
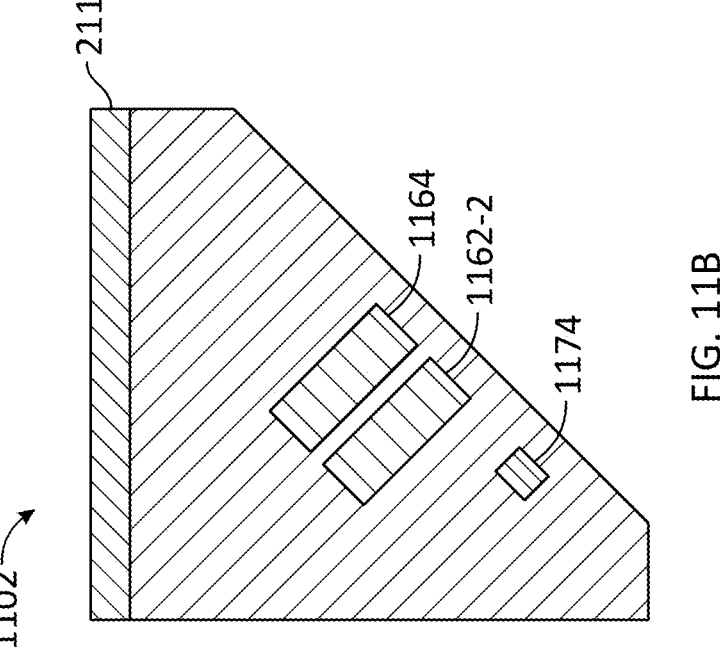
FIGS. 11A-B illustrate diagrams of various transducer configurations for multichannel sonar systems in accordance with embodiments of the disclosure.
Figure 11A:
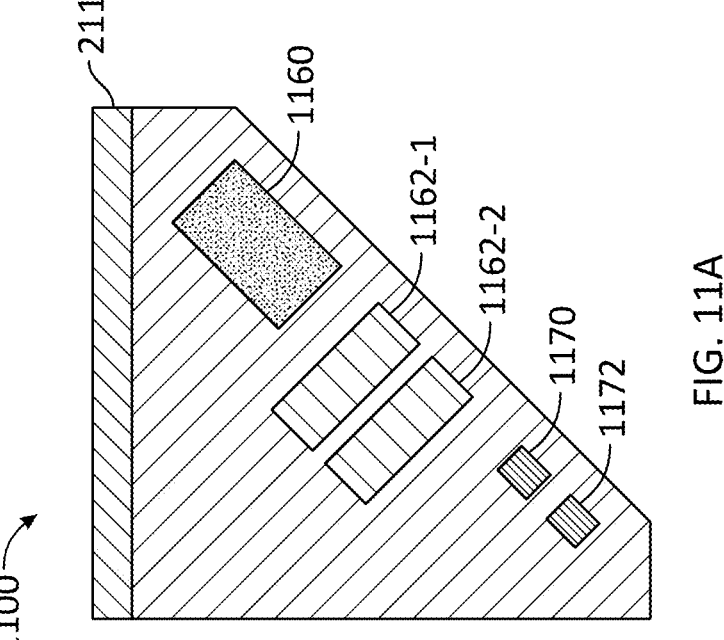

FIGS. 11A-B illustrate diagrams 1100 and 1102 of various transducer configurations for multichannel sonar systems (e.g., 3D capable multichannel sonar systems providing enhanced sonar imagery) in accordance with embodiments of the disclosure. In particular, configurations 1100 and 1102 use interferometric sonar subsystems of a multichannel sonar system to generate 3D models or representations of an underwater scene and enhance such 3D models with additional sonar data provided by sidescan sonar subsystems integrated within the same multichannel sonar system.

More generally, a sonar system combining desirable aspects of two different sonar subsystems may include a transmitter channel and at least a pair of receiver channels operating around a first frequency, where the transmitter channel may be a separate channel or combined with the receiver channels. Such sonar system may include a second transmitter channel and at least a receiver channel operating around a second frequency, where the transmitter channel may be a separate channel or combined with the receiver channel, as described herein. The system may be configured to transmit at the first frequency and receive on the plurality of associated receiver channels and process to produce a section of a 3D representation of the underwater environment. Such sonar data may be combined with optional position data and optional attitude data to enhance the 3D sonar data. The system may be configured to transmit at the second frequency, either at the same time as the first frequency or after the first frequency to avoid interference, to receive at the second frequency on the associated receiver channel, to and generate a 2D sidescan texture.

In various embodiments, the system may conduct a series of multiple transmissions and acquisitions and combine the resulting set of spatial sonar data to generate a continuous 3D representation of the environment that has been interrogated and an associated 2D sidescan texture. For example, the system may generate a 3D representation of the underwater bottom surface using the data from the first frequency and render with the 2D texture generated from the second frequency, and/or generate a 3D representation of in-water targets and render with the data obtained from the second frequency. In some embodiments, the two sonar subsystems may be implemented within the same housing. In general, the various transducer elements may be relatively long and thin to produce narrow beams fore-aft and wide beams port-starboard, as described herein.

For example, configuration 1100 in FIG. 11A includes two sets of transducer elements, namely an interferometric sonar system transmitter transducer 1160 and corresponding interferometric sonar system receiver transducers 1162-1 and 1162-2 (e.g., a three channel multichannel sonar subsystem), and a sidescan sonar system transmitter transducer 1170 and corresponding sidescan sonar system receiver transducer 1172 (e.g., a two channel multichannel sonar subsystem). Configuration 1102 in FIG. 11A also includes two sets of transducer elements, but in a more compact configuration, namely an interferometric sonar system transmitter/receiver or transceiver transducer 1164 and corresponding interferometric sonar system receiver transducer 1162-2 (e.g., a two channel multichannel sonar subsystem), and a sidescan sonar system transmitter/receiver or transceiver transducer 1174 (e.g., a single channel sonar subsystem). Each configuration shown in FIGS. 11A-B are cross sectional views from an end of transducer housing 211, showing the starboard side of the sonar system and the top of housing 211 generally parallel to the water surface. As shown in FIGS. 11A-B, the 3D or interferometric sonar subsystem can produce both 3D spatial sonar data and 2D sidescan sonar data (e.g., another type of spatial sonar data), while the sidescan sonar subsystem can only produce sidescan sonar data.

In general, interferometric sonar systems/subsystems employ at least two receiver channels to perform interferometry on sonar returns sensed by each individual receiver channel to provide directionality and range to a source of a sonar return/reflection. Sidescan sonar systems/subsystems typically employ a single receiver channel. In some embodiments, each individual receiver channel/transducer element may be implemented by a linear transducer element longitudinally aligned with a longitudinal axis of mobile structure 101, so as to sense sonar returns within a fan shaped beam oriented generally orthogonally to the longitudinal axis (e.g., a direction of travel) of mobile structure 101. In the embodiments shown in FIGS. 11A-B, a pair of each configuration may be mounted to port and starboard sides of hull 105*b* to generate port and starboard sonar imagery, as described herein. In other embodiments, a pair of each configuration may be joined to each other to form transducer assembly 112, for example. In other embodiments, transducer assembly 112 may be configured to provide only port or starboard sonar imagery.

Figure 12A:
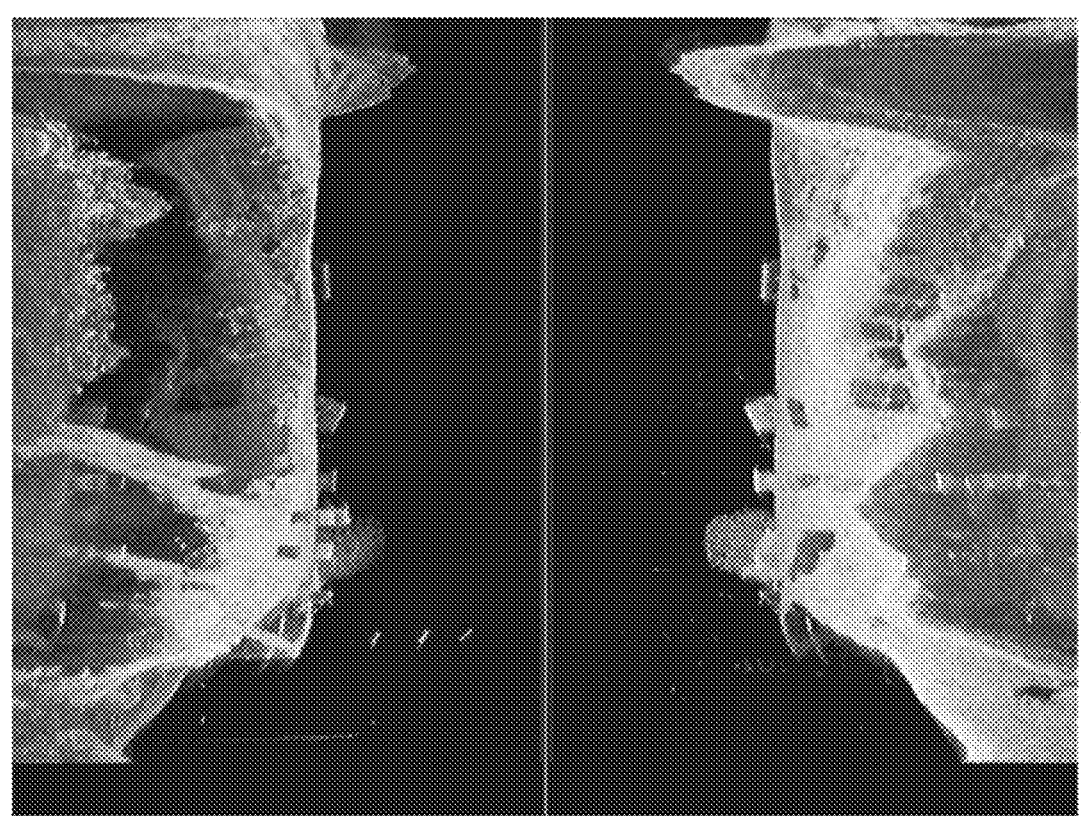
FIGS. 12A-B illustrate various display views of sonar data provided by a multichannel sonar system in accordance with embodiments of the disclosure.
Figure 12B:
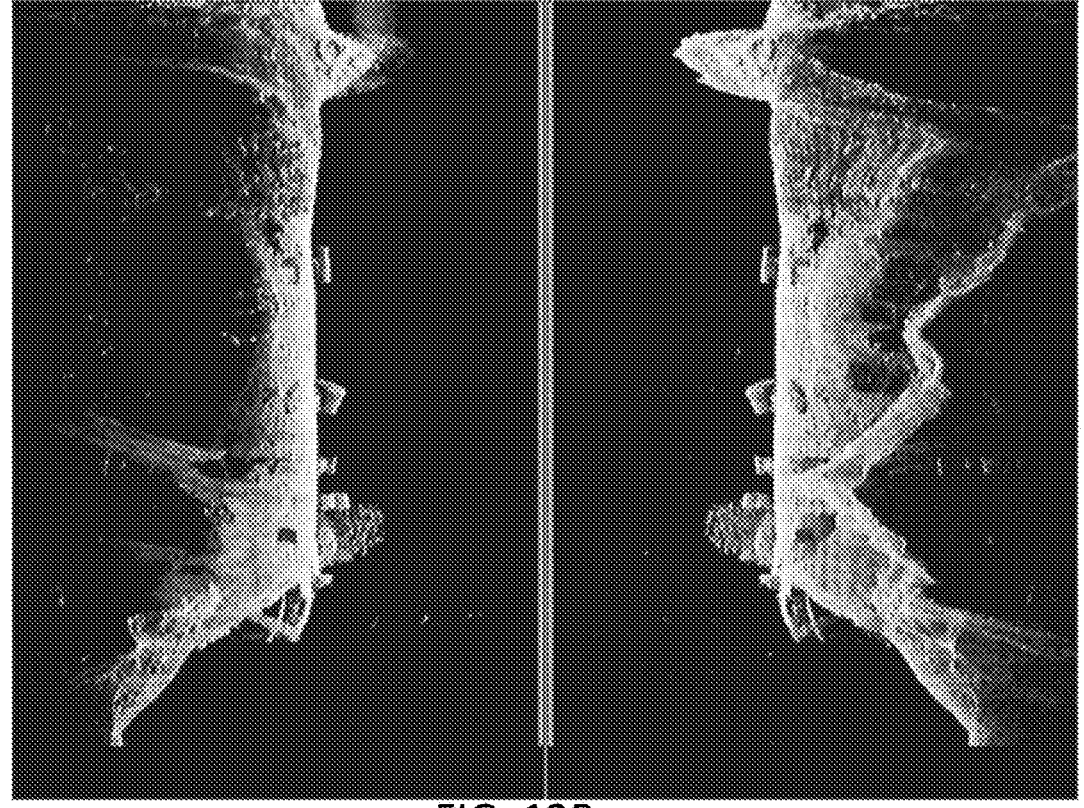

FIGS. 12A-B illustrate various display views 1200 and 1202 of sonar data provided by embodiments of multichannel sonar system configurations 1100 and/or 1102, in accordance with embodiments of the disclosure. For example, display view 1200 of FIG. 12A illustrates port and starboard sidescan sonar images of a water column and bed ensonified by corresponding port and starboard embodiments of interferometric sonar system transmitter transducer 1160 and corresponding interferometric sonar system receiver transducers 1162-1 and 1162-2, for example, or by interferometric sonar system transmitter/receiver or transceiver transducer 1164 and corresponding interferometric sonar system receiver transducer 1162-2. Display view 1202 of FIG. 12B illustrates port and starboard sidescan sonar images of the same water column and bed ensonified by corresponding port and starboard embodiments of sidescan sonar system transmitter transducer 1170 and corresponding sidescan sonar system receiver transducer 1172, for example, or by sidescan sonar system transmitter/receiver or transceiver transducer 1174.

Importantly, display views 1200 and 1202 illustrate how embodiments of multichannel transducer configurations 1100 and 1102 may be used to produce sonar data and/or imagery indicating water column and bed characteristics that are differentiated both by their depth and their relative port or starboard position, for example, and the configurations of their respective multichannel sonar subsystems. For instance, it is apparent from FIG. 12A that multichannel interferometric sonar system configurations can be configured to provide more spatial detail but less resolution and/or contrast than sidescan sonar system configurations operated at higher frequencies. Sonar data from both types of sonar system configurations may be registered to each other and combined to form 3D sonar data and/or imagery with desirable aspects of each type or source of sonar data.

As noted herein, the quality and clarity of a sidescan image (e.g., as shown in display views 1200 and 1202) can be improved by using higher frequencies, but higher frequencies do not travel as far in the water as lower frequencies, so the range of the generated image can be limited. In embodiments with two or more collocated sidescan sonars that operate at different frequencies, sonar imagery can be produced that combines the best qualities from each of the contributing sonar subsystems. For example, a sidescan image could be constructed where the high frequency sonar data is used for short ranges, while lower frequency sonar data can be used for longer ranges. Therefore, an enhanced image can be produced that has higher detail at shorter ranges and data out to longer ranges, which would not be available for the higher frequency alone. Embodiments provide enhanced sidescan sonar imagery by combining sources of data from collocated sonar subsystems, such as those shown in FIGS. 11A-B. Such sonar subsystems may be operated to avoid interference, either by differentiating their frequencies sufficiently or by interleaving ensonifications. Embodiments of such dual frequency sonar systems can be implemented by physically separate sonar systems and mounted in an approximate collocation on a vessel or tow fish or may be combined in a single housing such that the transducers are collocated, as shown in FIGS. 11A-B.

Methods for avoiding interference may include interleaving transmissions/ensonifications such that the sequence is time division multiplexed (TDM) between the subsystems; synchronizing transmissions such that transmissions start at the same time on all systems; synchronizing transmissions such that transmissions are staggered but almost simultaneous (e.g., starting a second ensonification just as the first ensonification ends, and ending the second ensonification before desirable sonar returns from the first ensonification begin to be received).

Methods for combining the frequency differentiated sonar data may include preprocessing to adjust the individual sources sonar data for noise reduction and optimized intensity and/or sensitivity. Then the frequency differentiated sonar data may be combined using one or a combination of the following non-exclusive list of techniques: linear weighted addition of sonar data; non-linear weighted combination of sonar data; weighted combination with inspection to select maximum after weighting.

Figure 13C:
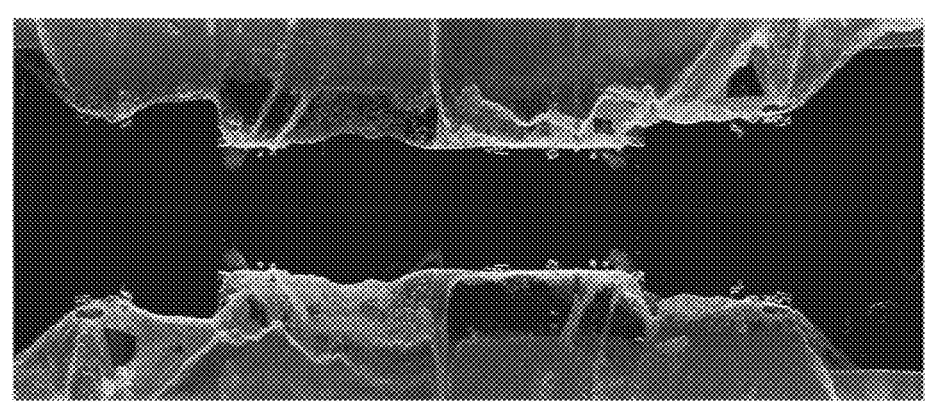
FIG. 13A-C illustrate various display views of sonar data provided by a multichannel sonar system in accordance with embodiments of the disclosure.
Figure 13B:
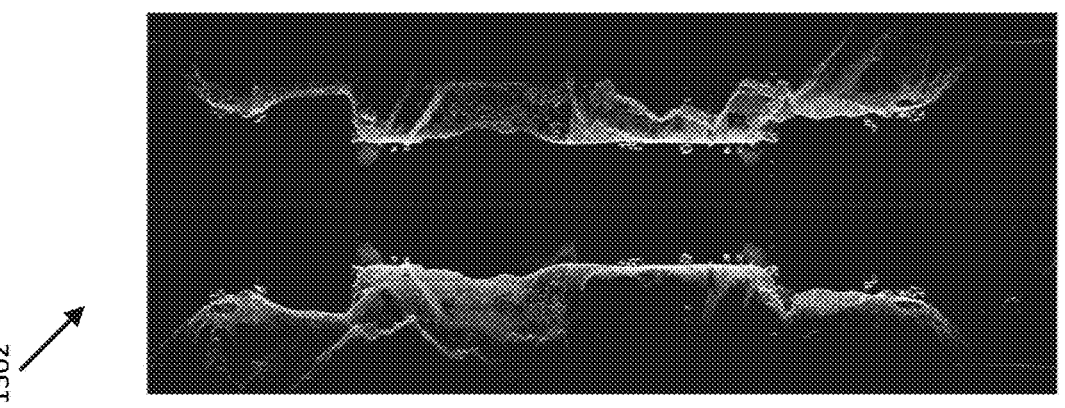
Figure 13A:
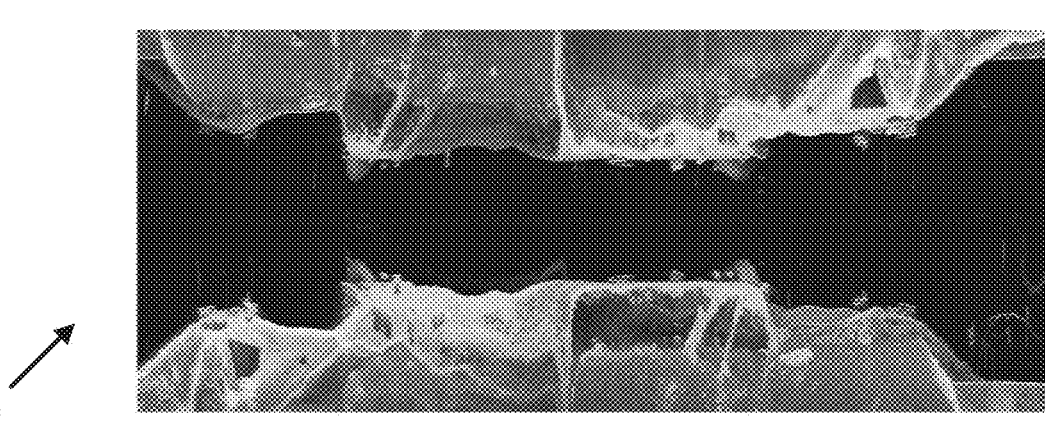

FIG. 13A-C illustrate various display views 1300, 1302, and 1304 of sonar data provided by a multichannel sonar system in accordance with embodiments of the disclosure. The sonar system used to generate display views 1300, 1302, and 1304 included a single set of electronics connected to a transducer assembly containing both a low frequency sidescan set of transducers (e.g., an interferometric sonar subsystem) and a set of high frequency sidescan transducers (e.g., a sidescan sonar subsystem), similar to configurations 1100 and 1102 of FIGS. 11A-B. The raw sonar data from each subsystem was acquired using TDM techniques to avoid interference. The combined result (e.g., shown in FIG. 13C) was obtained using a non-linear addition of sonar data from each subsystem after preprocessing for noise and intensity.

The non-linear algorithm was achieved through inspection of the high frequency data (e.g., FIG. 13B), which exhibits a non-linear degradation of intensity with range. The algorithm was therefore chosen to have a similar non-linear relationship with range. The actual algorithm used was as follows:

The combined sonar data (e.g., result) at a particular range cell for a particular transmission and sidescan side=A*high frequency sonar data at the corresponding range cell+(1−A)*low frequency sonar data at the corresponding range cell, where $$A = (\text{Range/Maximum Range})^0.75$$

This technique results in the data at zero range equaling the high frequency data, the data at maximum range equaling the low frequency data and the data in between equaling a non-linear combination of the two sources of data.

FIGS. 13A-C illustrate the source low and high frequency sonar data and the combined sonar data results. The low frequency sonar data (e.g., display view 1300 of FIG. 13A) extends out to the maximum display range, while the high frequency sonar data (e.g., display view 1302 of FIG. 13B) falls below the system noise level before the maximum display range. It can be seen that the high frequency sonar data has more contrast and more detail than the low frequency sonar data, but lacks the range of the low frequency sonar data. The combined sonar data imagery (e.g., display view 1304 of FIG. 13C) both extends out to the maximum display/system range and also shows higher detail than the low frequency sonar data imagery does alone.

Figure 14:
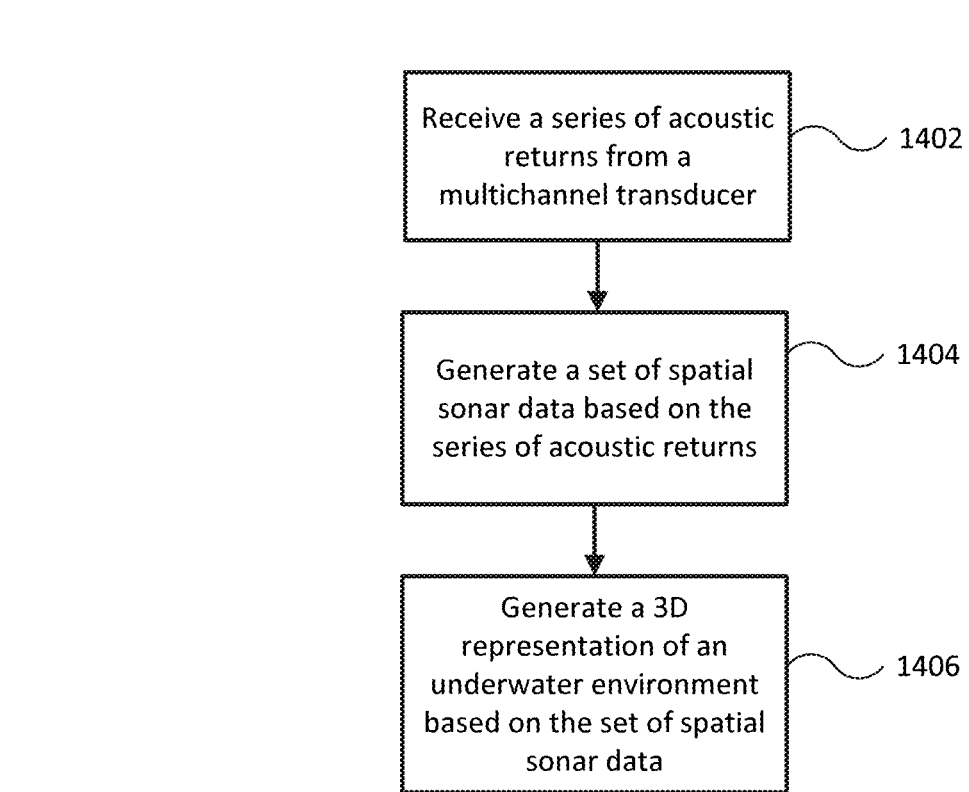
FIG. 14 illustrates a flow diagram of various operations to operate a single and/or multichannel sonar system in accordance with an embodiment of the disclosure.

FIG. 14 illustrates a flow diagram of process 1400 to provide sonar data and/or imagery for mobile structure 101 in accordance with embodiments of the disclosure. In some embodiments, the operations of FIG. 14 may be implemented as software instructions executed by one or more logic devices associated with corresponding electronic devices, sensors, structures, display views, and/or processes depicted in FIGS. 1A through 13C. More generally, the operations of FIG. 14 may be implemented with any combination of software instructions and/or electronic hardware (e.g., inductors, capacitors, amplifiers, actuators, or other analog and/or digital components).

It should be appreciated that any step, sub-step, sub-process, or block of process 1400 may be performed in an order or arrangement different from the embodiments illustrated by FIG. 14. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although process 1400 is described with reference to systems 100, 100B, 200, 201, 300, 301, and/or 400 and FIGS. 1A-4C, process 1400 may be performed by other systems different from those systems and including a different selection of electronic devices, sensors, assemblies, mobile structures, and/or mobile structure attributes. Process 1400 represents a method for providing sonar data and/or imagery for mobile structure 101 using systems 100, 100B, 200, 201, 300, 301, 400, and/or other systems, subsystems, transducer arrangements, and/or configurations in accordance with embodiments of the disclosure. At the initiation of process 1400, various system parameters may be populated by prior execution of a process similar to process 1400, for example, or may be initialized to zero and/or one or more values corresponding to typical, stored, and/or learned values derived from past operation of process 1400, as described herein.

In block 1402, a logic device receives a series of acoustic returns from a multichannel transducer. For example, controller 220 and/or co-controller 222 may be configured to control one or more of receivers 232 to receive acoustic returns from one or more of receive channels 262 of multichannel transducer 250, for example, and provide the received acoustic returns (e.g., in digital form) to co-controller 222. In other embodiments, controller 220 and/or co-controller 222 may be configured to control one or more of receivers 232 to receive acoustic returns from interferometric sonar subsystem receiver channels 1162-1 and 1162-2. In further embodiments, controller 220 and/or co-controller 222 may be configured to control transceiver 234 to receive a second series of acoustic returns from sidescan sonar subsystem receiver channel 1172 and provide the second set of received acoustic returns (e.g., in digital form) to co-controller 222. In various embodiments, transducer assembly 210 may be configured to use temperature sensor 266 and/or orientation/position sensor 240 to record corresponding measurements at substantially the same time. Notification of reception and/or other sensor information may be relayed to other devices of system 100 through cable 214. Controller 220 and/or co-controller 222 may be configured to aggregate a series of such acoustic returns and/or other data to form a time series of acoustic returns, for example.

In block 1404, a logic device generates a set of spatial sonar data based on a series of acoustic returns. For example, controller 220 and/or co-controller 222 may be configured to generate a set of spatial sonar data (e.g., as shown in display views 1200, 1202, 1300, and 1302) based, at least in part, on the series of acoustic returns received in block 1402. In some embodiments, where the series of acoustic returns are provided by an interferometric sonar subsystem of the multichannel transducer, such set of spatial sonar data may include range and/or directional data associated with each one of the series of acoustic returns received in block 1404, for example, and/or a first set of sidescan sonar data based on the same set of acoustic returns. In embodiments where a second series of acoustic returns are provided by a sidescan sonar subsystem of the multichannel transducer, a second set of spatial sonar data may be generated, such as a set of sidescan sonar data, as described herein.

In block 1406, a logic device generates a 3D representation of an underwater environment based on a set of spatial sonar data. For example, controller 220 and/or co-controller 222 may be configured to generate a 3D representation of an underwater environment based, at least in part, on the set of spatial sonar data generated in block 1404, as described herein. For example, such 3D representation may include a 3D grid of depths of a bottom of the underwater environment, such as a bathymetric grid of the underwater environment.

In block 1408, a logic device generates an enhanced 3D representation based on a 3D representation and a set of spatial data. For example, controller 220 and/or co-controller 222 may be configured to generate an enhanced 3D representation of the underwater environment based, at least in part, on the 3D representation generated in block 1406 and a set of spatial data different from the set of spatial sonar data generated in block 1404. Such differentiated spatial data may include sidescan sonar data from the same interferometric sonar subsystem (e.g., by processing the acoustic returns differently to generate sidescan sonar data), sonar data from a different sonar system or subsystem, a camera, a ranging system, a chart, and/or other spatial data sources, as described herein. In embodiments where the multichannel transducer includes an interferometric sonar subsystem and a sidescan sonar subsystem, the differentiated set of spatial data may include a second set of spatial sonar data, such as a set of sidescan sonar data generated by the first series of acoustic returns (from the interferometric sonar subsystem) and/or a second series of acoustic returns received in block 1402 (from the sidescan sonar subsystem).

In alternative embodiments, controller 220 and/or co-controller 222 may be configured to generate an enhanced sidescan representation of the underwater environment based, at least in part, on first and second sets of sidescan sonar data generated in block 1404, as described herein. For example, controller 220 and/or co-controller 222 may be configured to combine a first set of sidescan sonar data provided by an interferometric sonar subsystem of the multichannel transducer with a second set of sidescan sonar data provided by a sidescan sonar subsystem of the multichannel transducer. In some embodiments, controller 220 and/or co-controller 222 may be configured to generate the enhanced 3D representation of the underwater environment based, at least in part, on a combination of the 3D representation (e.g., derived from the acoustic returns provided by the interferometric sonar subsystem), a set of sidescan sonar data (e.g., derived from the acoustic returns provided by the sidescan sonar subsystem), and a set of interferometric sidescan sonar data (e.g., derived from the acoustic returns provided by the interferometric sonar subsystem).

Once the enhanced 3D representation and/or enhanced sidescan representation is generated, controller 220 and/or controller 130 may be configured to relay the enhanced 3D and/or sidescan representations to user interface 120 to display the enhanced 3D and/or sidescan representations to a user of mobile structure 101. In some embodiments, controller 220 may be configured to render one or multiple different display views of the enhanced 3D and/or sidescan representations, for example, and relay the display views and/or corresponding sonar image data to user interface 120.

It is contemplated that any one or combination of methods to provide sonar data and/or imagery may be performed according to one or more operating contexts of a control loop, for example, such as a startup, learning, running, and/or other type operating context. For example, process 1400 may proceed back to block 1402 and proceed through process 1400 again to produce updated sonar data and/or imagery, as in a control loop. In addition, it is also contemplated that such methods to provide sonar data and/or imagery may be performed substantially in real time and/or generally synchronous with acquisition of acoustic returns, so as to provide a user of mobile structure with substantially real time awareness of the underwater environment associated with navigation of mobile structure 101.

Embodiments of the present disclosure can thus provide inexpensive, feature-filled, reliable, compact, and accurate sonar systems, data and/or imagery. Such embodiments may be used to provide sonar data to assist in navigation and/or mapping for a mobile structure and/or to assist in the operation of other systems, devices, and/or sensors coupled to the mobile structure.

In maritime applications it is common for sonar systems to lose bottom lock with the seafloor. The most common cause of bottom loss is aeration, which occurs when pockets of air (which the sonar signal cannot travel through), are introduced across the face of the transducer element(s). Aeration is common and most prevalent during high speed operation or when a vessel is reversed while docking or attempting to hold a GPS lock while fishing. Such aeration causes sonar systems to lose sight of the seafloor and initiate a process to reacquire a bottom lock.

Conventionally, bottom reacquisition can take considerable time as a sonar system uses the last known depth along with a predefined set of depth ranges to initiate soundings and wait for the sonar signals to return. A conventional sonar system steps through this predefined set of ranges with no intelligence and simply relies upon the last known depth reading to initiate the open hunt. Often, the last known depth reading is unreliable and no longer accurate, and, the conventional sonar system repeats the hunt at different depths until the bottom is reacquired. While the sound of speed through water is relatively quick, the requirement to step through the predefined set of ranges, along with outside factors such as additional aeration and an undulating seafloor, often prolongs the reacquisition of bottom and results in sonar data and/or resulting imagery with significant spatial and/or temporal gaps, which can degrade the safety and reliability of assisted and/or autonomous navigation.

Conventional sonar bottom reacquisition algorithms work by stepping through a sequence of predefined target depths. First, a conventional sonar system will ping at the last known depth and wait for a reflection/sonar return at the approximate round-trip time. If no bottom-reflected sonar return is received at the approximate round-trip time (determined based on the expected bottom depth and the speed of the ensonification in the medium), the sonar system will then determine the bottom acquisition is lost and employ a "lost state" algorithm by which it performs a local search of the last known bottom depth reading (e.g., searching up to two consecutively deeper ranges). If the "lost state" algorithm is unsuccessful, the sonar system will then enter a "hunting state" and work through a predefined sequence of depths (e.g., one such sequence is 10 m, 1000 m, 500 m, 200 m, 50 m, 10 m, 3000 m). At each increment, the sonar system will emit a sonar signal/ensonification and wait for the corresponding sonar return, repeating this process up to 30 times before moving to the next depth range. It is not uncommon for contemporary high-performance sonar systems to have a maximum depth range of 3,000 m or greater. This presents a challenge as the greater the depth, the longer the sonar must wait for a reflection of a ping.

One method for overcoming this inherent challenge is the implementation of a max depth limit. This enables a user to set a maximum depth within which to search, thereby eliminating unnecessary relatively deep depth searching. For example, if a user has equipment capable of reaching depths of 3,000 meters but will never traverse waters greater than 1000 meters, setting a max depth limit of 1,000 m would eliminate the 3,000 m range from the depth hunt algorithm. While this approach eliminates unnecessary searching at greater depths, it does not benefit the sonar system at shallower depth and would require the sonar system to follow at least a portion of a predefined hunt sequence.

Embodiments described herein leverage data from cartography spot soundings to speed the bottom reacquisition process. For example, if a sonar system loses bottom acquisition, rather than work through a sequence of ranges in a relatively time-inefficient hunt algorithm, the sonar system uses cartography spot soundings (e.g., a bathymetric chart) to provide the sonar system with the most accurate depth estimate from which to initiate a bottom reacquisition process. This chart depth or estimated bottom depth may be extracted from the chart via controller 130 and/or user interface 120 and used to configured sonar system 110 to generate sonar data according to the estimated bottom depth. If no bottom is found using the chart-based estimated bottom depth, then the sonar system may revert to hunting through a selection of depth ranges (e.g., the sequence mentioned previously, or a sequence generated based on the estimated bottom depth). One advantage of using such chart-based estimated bottom depth is that it can dramatically increase the speed at which the sonar system reacquires bottom lock.

Figure 15:
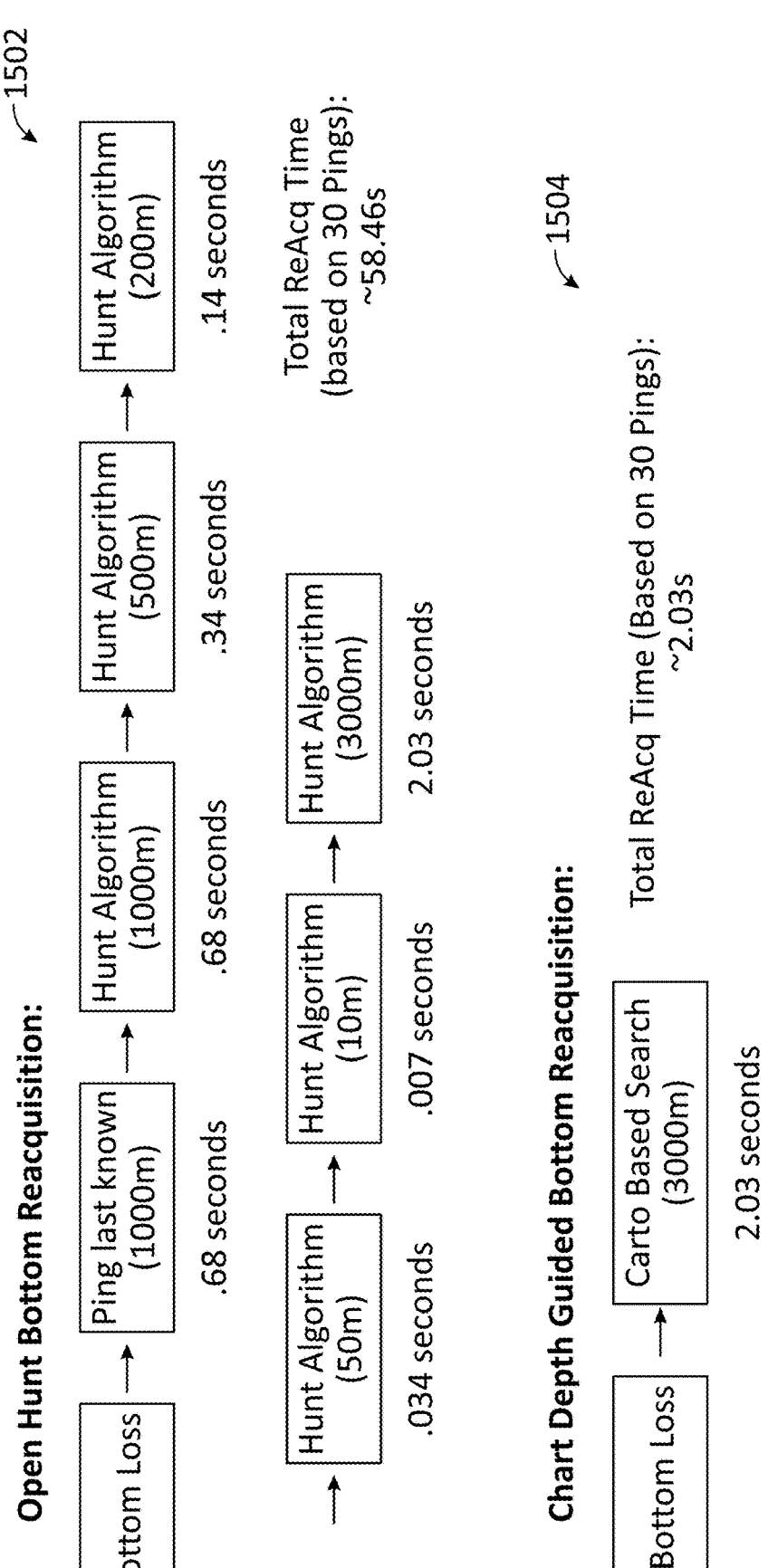
FIG. 15 illustrates a comparison of bottom reacquisition techniques for a sonar system in accordance with an embodiment of the disclosure.

FIG. 15 illustrates a time comparison 1500 of bottom reacquisition techniques 1502, 1504 for sonar system 110 in accordance with an embodiment of the disclosure. In FIG. 15, time comparison 1500 shows the approximate time to complete bottom reacquisition after determining bottom loss has occurred as a vessel traverses a drop off that changes the bottom depth from 1000 m to 3000 m. As shown in FIG. 15, open hunt bottom reacquisition 1502 first attempts to reacquire depth at the last known depth, which takes a minimum time of 0.68 seconds per ping, then retries the same depth, and then proceeds through a sequence of predefined depths that reacquire the bottom depth of 3000 m after a total of approximately 1 minute of hunting (each depth is typically attempted approximately 30 times before moving on to the next depth in the sequence).

By contrast, chart depth guided bottom reacquisition 1504 simply uses the position of mobile structure 101 (e.g., provided by GNSS 146) and a bathymetric chart to determine the expected bottom depth of 3000 m, then pings the bottom at the expected bottom depth and reacquires bottom in approximately 2 seconds, for a greater than 95% improvement in bottom reacquisition time, which in turn generates relatively high quality sonar data and/or imagery without the 1 minute gap in data that occurs using open hunt bottom reacquisition 1502. Over a typical course for mobile structure 101, which may encounter many such drop offs or bottom losses due to aeration of a transducer assembly of sonar system 110 and/or a water column beneath the transducer assembly, chart depth guided bottom reacquisition 1504 can generate significantly more reliable and complete sonar imagery of the water column, which can in turn significantly increase the reliability and safety of assisted and/or autonomous navigation of mobile structure 101.

Figure 16:
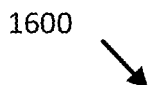
FIG. 16 illustrates a flow diagram of various operations to operate a sonar system in accordance with an embodiment of the disclosure.
Figure 16:
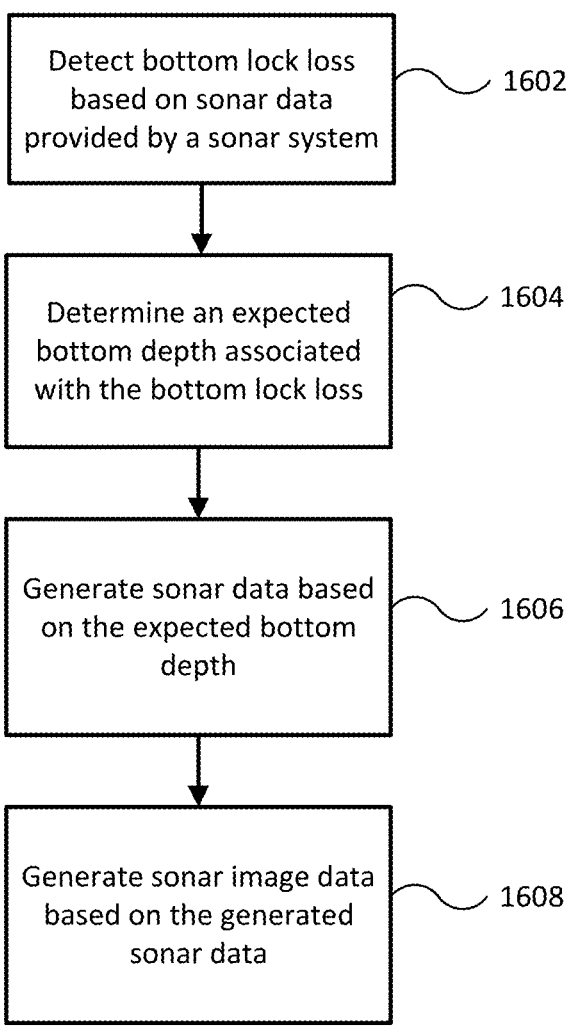

FIG. 16 illustrates a flow diagram of process 1600 to provide sonar data and/or imagery for mobile structure 101 in accordance with embodiments of the disclosure. In some embodiments, the operations of FIG. 16 may be implemented as software instructions executed by one or more logic devices associated with corresponding electronic devices, sensors, structures, display views, and/or processes depicted in FIGS. 1A through 13C. More generally, the operations of FIG. 16 may be implemented with any combination of software instructions and/or electronic hardware (e.g., inductors, capacitors, amplifiers, actuators, or other analog and/or digital components).

It should be appreciated that any step, sub-step, sub-process, or block of process 1600 may be performed in an order or arrangement different from the embodiments illustrated by FIG. 16. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although process 1600 is described with reference to systems 100, 100B, 200, 201, 300, 301, and/or 400 and FIGS. 1A-4C, process 1600 may be performed by other systems different from those systems and including a different selection of electronic devices, sensors, assemblies, mobile structures, and/or mobile structure attributes. Process 1600 represents a method for providing sonar data and/or imagery for mobile structure 101 using systems 100, 100B, 200, 201, 300, 301, 400, and/or other systems, subsystems, transducer arrangements, and/or configurations in accordance with embodiments of the disclosure. At the initiation of process 1600, various system parameters may be populated by prior execution of a process similar to process 1600, for example, or may be initialized to zero and/or one or more values corresponding to typical, stored, and/or learned values derived from past operation of process 1600, as described herein.

In block 1602, a logic device detects bottom lock loss. For example, controller 130, controller 220, and/or co-controller 222 of system 100 may be configured to detect bottom lock loss based, at least in part, on sonar data provided by sonar system 110 (e.g., which may be generated by a process similar to process 1000A of FIG. 10A and/or process 1400 of FIG. 14). In some embodiments, system 100 may be configured to detect the bottom lock loss by determining that the sonar data provided by sonar system 110 lacks acoustic returns corresponding to a bottom lock depth associated with a present bottom lock of sonar system 110.

For example, controller 130, controller 220, and/or co-controller 222 may be configured to estimate a speed of ensonification (e.g., a speed of sound) for a water column beneath sonar system 110 (e.g., based, at least in part, on a temperature of at least a portion of the water column), transmit a sonar signal or ping, and then monitor a sounding acquisition time period for acoustic returns corresponding to the bottom lock depth, where the sounding acquisition time period is based, at least in part, on the estimated speed of ensonification and the bottom lock depth. In some embodiments, the sounding acquisition time period may be based on the start time of the transmitted sonar signal and/or the temporal width of the transmitted sonar signal.

In block 1604, a logic device determines an expected bottom depth. For example, controller 130, controller 220, and/or co-controller 222 of system 100 may be configured to determine an expected bottom depth associated with the bottom lock loss detected in block 1602. In some embodiments, controller 130, controller 220, and/or co-controller 222 may be configured to determine a position of mobile structure 101 based, at least in part, on position data provided by GNSS 146, and then determine the expected bottom depth based, at least in part, on the determined position of mobile structure 101 and bathymetric chart data (e.g., stored and retrieved from memory of system 100, for example, or from a remote chart delivery server accessed wirelessly via a communications module of system 100— other modules 180) of an area underlying the position and/or a course for mobile structure 101. For example, controller 130 and/or user interface 120 may be configured to determine the expected bottom depth based on interpolation of one or more cartographic spot soundings within the bathymetric chart data.

In block 1606, a logic device generates sonar data. For example, controller 130, controller 220, and/or co-controller 222 of system 100 may be configured to generate sonar data based, at least in part, on the expected bottom depth determined in block 1604. In some embodiments, system 100 may be configured to operate according to a process similar to process 1000A of FIG. 10A and/or 1400 of FIG. 14 to generate such sonar data, such as by transmitting a sonar signal, receiving acoustic returns, and generating the sonar data based, at least in part, on the acoustic returns and the expected bottom depth determined in block 1604. System 100 may be configured to monitor a sounding acquisition time period for acoustic returns corresponding to the expected bottom depth, where the sounding acquisition time period is based, at least in part, on an estimated speed of ensonification of the water column beneath sonar system 110. If acoustic returns are present within the sounding acquisition time period, then bottom lock has been reacquired, and system 100 may proceed to block 1608 to generate sonar image data corresponding to the water column between sonar system 110 and a bottom of the water column.

In some embodiments, system 100 may be configured to determine bottom lock loss is still occurring, using a method similar to the processes described with reference to block 1602. Upon such determination, system 100 may be configured to generate further updated sonar data based, at least in part, on a set of test bottom depths. In some embodiments, the set of test bottom depths includes a set of predefined bottom depths based, at least in part, on a maximum and/or minimum depth capability of sonar system 110. In another embodiment, the set of test bottom depths is based, at least in part, on a user-provided maximum operational depth for mobile structure 101. In a further embodiment, the set of test bottom depths is based, at least in part, on a corresponding set of cartographic spot soundings of the bathymetric chart data that are within a predefined horizontal range of the determined position of mobile structure 101. In any such embodiments, if acoustic returns are present within the sounding acquisition time periods for a particular bottom depth within the set of bottom depths, then bottom lock has been reacquired, and system 100 may proceed to block 1608.

In block 1608, a logic device generates sonar image data. For example, controller 130, controller 220, and/or co-controller 222 of system 100 may be configured to generate sonar image data based, at least in part, on the sonar data generated in block 1608. In various embodiments, system 100 may be configured to generate sonar image data using any of the processes described herein, such as processes 1000A, 1000B, and 1400 of FIGS. 10A-B and 14. In some embodiments, after bottom lock is reacquired, system 100 may be configured to perform such processes in a control loop to generate a relatively large series or set of sonar image data, as described herein, including an enhanced 3D and/or sidescan representation of an underwater environment, sonar image data sourced from a single and/or multichannel sonar system, combined sonar image data, and/or other types of sonar image data.

Once such sonar image data is generated, controller 220 and/or controller 130 may be configured to relay the sonar image data to user interface 120 to display the sonar image data to a user of mobile structure 101. In some embodiments, controller 220 may be configured to render one or multiple different display views of the sonar image data, for example, and relay the display views and/or corresponding sonar image data to user interface 120.

It is contemplated that any one or combination of methods to provide sonar data and/or imagery may be performed according to one or more operating contexts of a control loop, for example, such as a startup, learning, running, and/or other type operating context. For example, process 1600 may proceed back to block 1602 and proceed through process 1600 again to produce updated sonar data and/or imagery, as in a control loop. In addition, it is also contemplated that such methods to provide sonar data and/or imagery may be performed substantially in real time and/or generally synchronous with acquisition of acoustic returns, so as to provide a user of mobile structure with substantially real time awareness of the underwater environment associated with navigation of mobile structure 101.

Embodiments of the present disclosure can thus provide inexpensive, feature-filled, reliable, compact, and accurate sonar systems, data and/or imagery. Such embodiments may be used to provide sonar data to assist in navigation and/or mapping for a mobile structure and/or to assist in the operation of other systems, devices, and/or sensors coupled to the mobile structure.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:

a sonar transducer assembly including a housing adapted to be mounted to a mobile structure;

a sonar transducer disposed within the housing; and a logic device configured to communicate with the sonar transducer, wherein the logic device is configured to:

receive and process sonar data provided by the sonar transducer, the sonar data including data associated with a depth of a bottom surface in an underwater environment;

establish a bottom lock at the depth of the bottom surface based on the sonar data provided by the sonar transducer;

detect bottom lock loss of the bottom surface in the sonar data provided by the sonar transducer, based at least in part on a determination that the sonar data provided by the sonar transducer lacks acoustic returns corresponding to a bottom lock depth associated with the bottom lock;

determine a position of the mobile structure and/or of the sonar transducer;

determine an expected bottom depth associated with the detected bottom lock loss based at least in part on the determined position and bathymetric chart data of an area underlying at least the determined position; and generate updated sonar data based, at least in part, on the expected bottom depth;

wherein the generating the updated sonar data comprises:

transmitting a sonar signal via the sonar transducer; and monitoring a sounding acquisition time period for acoustic returns corresponding to the determined expected bottom depth, wherein the sounding acquisition time period is based, at least in part, on the expected bottom depth.

2. The system of claim 1, wherein the logic device is further configured to determine the sonar data lacks the acoustic returns corresponding to the bottom lock depth by:

estimating a speed of ensonification for a water column beneath the sonar transducer;

transmitting a sonar signal via the sonar transducer;

monitoring a sounding acquisition time period for the acoustic returns corresponding to the bottom lock depth, wherein the sounding acquisition time period is based, at least in part, on the estimated speed of ensonification.

3. The system of claim 1, wherein the logic device is further configured to determine the expected bottom depth by:

determining the position of the mobile structure and/or of the sonar transducer based, at least in part, on position data provided by a position sensor coupled to the mobile structure.

4. The system of claim 3, further comprising the position sensor coupled to the mobile structure, wherein:

the bathymetric chart data is stored within a memory coupled to and/or integrated with the mobile structure or within a remote chart delivery server accessible wirelessly via a communications module coupled to and/or integrated with the mobile structure and/or a user interface of the mobile structure.

5. The system of claim 3, wherein:

the expected bottom depth is determined based, at least in part, on interpolation of one or more cartographic spot soundings within the bathymetric chart data.

6. The system of claim 1, wherein the logic device is further configured to generate the updated sonar data by:

estimating a speed of ensonification for a water column beneath the sonar transducer;

wherein the sounding acquisition time period is based, at least in part, on the estimated speed of ensonification.

7. The system of claim 6, wherein the logic device is further configured to:

determine acoustic returns corresponding to the expected bottom depth are absent from the updated sonar data; and generate further updated sonar data based, at least in part, on a set of test bottom depths, wherein:

the set of test bottom depths is based, at least in part, on a corresponding set of cartographic spot soundings of the bathymetric chart data that are within a predefined horizontal range of the position of the mobile structure.

8. The system of claim 1, further comprising a user interface for the mobile structure, wherein the logic device is further configured to:

generate sonar image data based, at least in part, on the updated sonar data, wherein the sonar image data comprises an enhanced three dimensional (3D) and/or sidescan representation of an underwater environment associated with the mobile structure.

9. A method comprising:

processing sonar data provided by a sonar transducer disposed within a housing of a sonar transducer assembly mounted to a mobile structure, the sonar data including data associated with a depth of a bottom surface in an underwater environment;

establishing a bottom lock at the depth of the bottom surface under the mobile structure and/or a course of the mobile structure based on the sonar data provided by the sonar transducer;

detecting bottom lock loss of the bottom surface in the sonar data provided by the sonar transducer, based at least in part on a determination that the sonar data provided by the sonar transducer lacks acoustic returns corresponding to a bottom lock depth associated with the bottom lock;

determining a position of the mobile structure and/or of the sonar transducer;

determining an expected bottom depth associated with the detected bottom lock loss based at least in part on the determined position and bathymetric chart data of an area underlying at least the determined position and/or a course of the mobile structure; and generating updated sonar data based, at least in part, on the expected bottom depth.

10. The method of claim 9, wherein the determining the sonar data lacks the acoustic returns corresponding to the bottom lock depth comprises:

estimating a speed of ensonification for a water column beneath the sonar transducer;

transmitting a sonar signal via the sonar transducer;

monitoring a sounding acquisition time period for the acoustic returns corresponding to the bottom lock depth, wherein the sounding acquisition time period is based, at least in part, on the estimated speed of ensonification, the bottom lock depth, a start time of the transmitted sonar signal, and/or a temporal width of the transmitted sonar signal.

11. The method of claim 9, wherein the determining the expected bottom depth comprises:

determining the position of the mobile structure and/or of the sonar transducer based, at least in part, on position data provided by a position sensor coupled to the mobile structure.

12. The method of claim 11, wherein:

the bathymetric chart data is stored within a memory coupled to and/or integrated with the mobile structure or within a remote chart delivery server accessible wirelessly via a communications module coupled to and/or integrated with the mobile structure and/or a user interface of the mobile structure.

13. The method of claim 11, wherein:

the determining the expected bottom depth is based, at least in part, on interpolation of one or more cartographic spot soundings within the bathymetric chart data.

14. The method of claim 9, wherein the generating the updated sonar data comprises:

estimating a speed of ensonification for a water column beneath the sonar transducer;

wherein the sounding acquisition time period is based, at least in part, on the estimated speed of ensonification.

15. The method of claim 14, further comprising:

determining acoustic returns corresponding to the expected bottom depth are absent from the updated sonar data; and generating further updated sonar data based, at least in part, on a set of test bottom depths, wherein:

the set of test bottom depths is based, at least in part, on a corresponding set of cartographic spot soundings of the bathymetric chart data that are within a predefined horizontal range of the position of the mobile structure.

16. The method of claim 9, further comprising:

generating sonar image data based, at least in part, on the updated sonar data, wherein the sonar image data comprises an enhanced three dimensional (3D) and/or sidescan representation of an underwater environment associated with the mobile structure.

* * * * *